United States Patent
Shah et al.

(10) Patent No.: US 6,460,080 B1
(45) Date of Patent: Oct. 1, 2002

(54) CREDIT BASED FLOW CONTROL SCHEME OVER VIRTUAL INTERFACE ARCHITECTURE FOR SYSTEM AREA NETWORKS

(75) Inventors: Hemal V. Shah, Hillsboro; Rajesh S. Madukkarumukumana, Beaverton, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/984,823

(22) Filed: Oct. 31, 2001

Related U.S. Application Data

(63) Continuation of application No. 09/377,914, filed on Aug. 20, 1999, now Pat. No. 6,347,337.
(60) Provisional application No. 60/115,396, filed on Jan. 8, 1999.

(51) Int. Cl.[7] .............................................. G06F 13/00
(52) U.S. Cl. ...................................... 709/224; 709/217
(58) Field of Search ................................. 709/200, 201, 709/203, 217, 218, 219, 220, 223, 224, 227, 228, 231

(56) References Cited

U.S. PATENT DOCUMENTS

| | | |
|---|---|---|
| 4,449,182 A | 5/1984 | Rubinson et al. ............. 710/60 |
| 4,475,192 A | 10/1984 | Fernow et al. ............... 370/232 |
| 4,703,475 A | 10/1987 | Dretzka et al. ............. 370/394 |
| 5,432,784 A | 7/1995 | Ozveren ..................... 370/235 |
| 5,453,982 A | 9/1995 | Pennington et al. ........ 370/235 |
| 5,483,526 A | 1/1996 | Ben-Numn et al. ........ 370/60.1 |
| 5,610,745 A | 3/1997 | Bennett ...................... 359/139 |
| 5,617,409 A | 4/1997 | Ozveren et al. ............ 375/235 |

(List continued on next page.)

OTHER PUBLICATIONS

Angelos Bilas and Edward W. Felten, "Fast RPC on the SHRIMP Virtual Memory Mapped Network Interface", In *Journal of Parallel and Distributed Computing*, Feb. 1997, pp. 1–22.

M. Blumrich et al., "Virtual Memory Mapped Network Interface for the SHRIMP Multicomputer",*Proceedings of the 21st Annual Symposium on Computer Architecture*, 1994, pp. 142–153.

Chi–Chao Chang and Thorsten von Eicken, "A Software Architecture for Zero–Copy RPC in Java", *CS Technical Report 98–1708*, Cornell University, Sep. 1998, pp. 1–15.

Stefanos N. Damianakis, Cezary Dubnicki, and Edward W. Felten, "Stream Sockets on SHRIMP", Technical Report TR–513–96, Dept. of Computer Science, Princeton University, Feb. 1996.

Dave Dunning et al., "The Virtual Interface Architecture", *IEEE MICRO*, Mar./Apr. 1998, vol. 18, No. 2, pp. 66–76.

Thorsten von Eicken et al., U–Net A User–Level Network Interface for Parallel and Distributed Computing, *Proc. of the 15th ACM Symposium on Operating System Principles*, 1995, pp. 1–13.

(List continued on next page.)

*Primary Examiner*—Moustafa M. Meky
(74) *Attorney, Agent, or Firm*—Antonelli, Terry, Stout & Kraus, LLP

(57) ABSTRACT

A transport service provider provides a credit-based flow control scheme and is designed to operate over VI Architecture. The credit-based flow control scheme reduces overhead (e.g., reduces buffer copies and kernel processing) by relying upon the reliability properties of the underlying VI Architecture. If the number of send credits is sufficient, then the sender prepares and sends the packet. Otherwise, the sender sends a Credit Request and waits for a Credit Response. Upon receiving the corresponding Credit Response, the sender continues sending data packets. In response to a sender's Credit Request, the receiver sends the Credit Response only when it has enough receive credits (above a threshold value or low water mark).

8 Claims, 13 Drawing Sheets

U.S. PATENT DOCUMENTS

| | | | | |
|---|---|---|---|---|
| 5,633,867 | A | | 5/1997 | Ben-Nun et al. ............ 370/399 |
| 5,636,371 | A | * | 6/1997 | Yu .............................. 395/500 |
| 5,737,535 | A | | 4/1998 | Bagley et al. ............... 709/227 |
| 5,748,613 | A | | 5/1998 | Kilk et al. ................... 370/231 |
| 5,799,155 | A | | 8/1998 | Yasue et al. ................ 709/236 |
| 5,825,748 | A | | 10/1998 | Barkey et al. ............... 370/236 |
| 5,852,602 | A | | 12/1998 | Sugawara .................... 370/231 |
| 6,044,406 | A | | 3/2000 | Barkey et al. ............... 709/235 |
| 6,092,108 | A | | 7/2000 | DiPlacido et al. ........... 709/224 |
| 6,134,617 | A | | 10/2000 | Weber ......................... 710/105 |
| 6,163,834 | A | * | 12/2000 | Garcia et al. ................ 711/206 |
| 6,237,038 | B1 | | 5/2001 | Yasue et al. ................ 709/236 |
| 6,249,819 | B1 | | 6/2001 | Hunt et al. .................. 709/232 |
| 6,321,276 | B1 | * | 11/2001 | Forin ............................. 710/3 |
| 6,360,220 | B1 | * | 3/2002 | Forin ............................. 707/8 |

OTHER PUBLICATIONS

Rajesh S. Madukkarumukumana, Calton Pu, and Hemal V. Shah, "Harnessing User–Level Networking Architectures for Distributed Object Computing over High–Speed Networks", In *Proceedings of 2nd USENIX Windows NT Symposium*, 1998.

Giles Muller et al., "Fast Optimized Sun RPC Using Automatic Program Specialization", In *Proceedings of the International Conference on Distributed Computing Systems* (ICDCS–18), May 1998.

Scott Pakin, Vijay Karamcheti, and Andrew A. Chien, "Fast Messages: Efficient, Portable Communication for Workstation Clusters and MPPs", *IEEE Concurrency*, 1997.

Steven H. Rodrigues, Thomas E. Anderson and David E. Culler, "High–Performance Local Area Communication With Fast Sockets", *USENIX 1997 Conference*, 1997.

Matthew J. Zelesko and David R. Cheriton, "Specializing Object–Oriented RPC for Functionality and Performance", In *Proceedings of the International Conference on Distributed Computing Systems* (ICDCS–16), May 1996.

Olan M. Zimmer and Andrew A. Chien, "The Impact of Inexpensive Communication on a Commercial RPC System", Aug. 1998.

* cited by examiner

VI ARCHITECTURAL MODEL

FIG. 3

TRANSPORT SERVICES

|  | TCP | TRANSPORT SERVICE PROVIDER 13 USER-LEVEL STREAM SOCKETS OVER VI ARCH. |
|---|---|---|
| CONNECTION-ORIENTED | YES | YES |
| MESSAGE BOUNDARIES? | NO | NO |
| DATA CHECKSUM? | YES | NO (VI NIC PROVIDES IT) |
| POSITIVE ACK? | YES | NO (TRANSPORT ERRORS ARE RARE ON RELIABLE DELIVERY AND RELIABLE RECEPTION VIs AND CONNECTION IS BROKEN IN CASE OF LOST PACKET) |
| TIMEOUT AND RETRANS? | YES | NO (ON RELIABLE DELIVERY AND RELIABLE RECEPTION VIs, TRANSPORT ERRORS ARE RARE AND CONNECTION IS BROKEN ON TRANSPORT ERRORS) |
| DUPLICATE DETECTION? | YES | NO (RELIABLE DELIVERY AND RELIABLE RECEPTION VIs GUARANTEE EXACTLY ONCE DELIVERY) |
| SEQUENCING? | YES | NO (RELIABLE DELIVERY AND RELIABLE RECEPTION VIs GUARANTEE IN ORDER DELIVERY) |
| FLOW CONTROL? | SLIDING WINDOW (INCORPORATES THE ABOVE) | CREDIT BASED (LIGHT WEIGHT, SENDER-INITIATED SYNCHRONOUS CREDIT UPDATES) |

WINDOWS SOCKETS 2 ARCHITECTURE

ROUND-TRIP LATENCY

FLOW CHART OF SEND(S,BUF,LEN)

DETAILS OF POLLING FOR MORE RECEIVED PACKETS

CREDIT BASED FLOW CONTROL SCHEME OVER VIRTUAL INTERFACE ARCHITECTURE FOR SYSTEM AREA NETWORKS

CROSS-REFERENCE TO RELATED APPLICATIONS

This application is a Rule 53(b) continuation of U.S. application Ser. No. 09/377,914, filed Aug. 20, 1999, now U.S. Pat. No. 6,347,337, the subject matter of which is incorporated herein by reference.

This application claims priority to U.S. Provisional Application Ser. No. 60/115,396, filed on Jan. 8, 1999, entitled "A Credit Based Flow Control Scheme Over Virtual Interface Architecture For System Area Networks."

FIELD

The invention generally relates to communications across a data network and in particular to a credit based flow control scheme for use over a Virtual Interface Architecture or the like.

BACKGROUND

Standard user-level networking architecture such as Virtual Interface (VI) Architecture enables distributed applications to perform low overhead communication over System Area Networks (SANs). The Virtual Interface (VI) Architecture is described in the Virtual Interface Architecture Specification, Version 1.0, Dec. 16, 1997. With the advent of System Area Networks (SANs), low latency and high bandwidth interconnects have become a reality. This has opened new horizons for cluster computing. The centralized in-kernel protocol processing in legacy transports (e.g., TCP/IP) prohibits applications from realizing the potential raw hardware performance offered by underlying high-speed networks. Virtual Interface (VI) Architecture standard has further made it possible to perform low overhead communication using off-the shelf SAN hardware. However, building high-level applications using primitives provided by VI Architecture is complex and requires substantial development efforts because the VI Architecture does not provide transport level functionality such as flow control, buffer management, fragmentation and reassembly. Moreover, it is impractical to implement existing network protocols such as the Transmission Control Protocol (TCP) over VI Architecture because this would result in unnecessary additional overhead. TCP uses a sliding window flow control protocol that uses sequence numbers, acknowledgments, error detection, retransmission of lost packets, etc., because the underlying network is presumed to be inherently unreliable. SANs have very low error rates and high reliability levels offered by VI Architecture (reliable delivery and reliable reception) and consider transport errors catastrophic. Thus, due to the reliable delivery and reliable reception of VIs, which break connection on extremely rare transport errors and guarantee exactly once, intact, in order data delivery, many of the functions performed by TCP to ensure reliability are redundant and would add unnecessary overhead.

Therefore, a need exists for a communication service that provides some transport level services over the VI Architecture, such as flow control, buffer management, fragmentation and reassembly, without adding unnecessary overhead.

SUMMARY

According to an embodiment of the invention, a method of sending data from a local endpoint system to a remote endpoint system across a network is provided. The local endpoint system includes a plurality of work queues for posting data transfer requests. It is determined if a sufficient number of send credits is available at the local endpoint system. A data packet is sent from the local endpoint system over the network if a sufficient number of send credits are available. Otherwise, if a sufficient number of send credits is not available at the local endpoint system, a credit request packet is sent from the local endpoint system to the remote endpoint system, and the local endpoint system waits for a credit response packet from the remote endpoint system before sending a data packet.

According to an embodiment of the invention, a method of receiving data at a local endpoint system across a network. The local endpoint system includes a plurality of work queues for posting data transfer requests, one or more registered send and receive buffers, and one or more application receive buffers. A packet is received and it is determined whether the packet is a data packet. Several steps are performed if it is a data packet. The system is polled for any additional packets that have been received by the local endpoint system. The data for all the received packets is copied from the registered receive buffers to one or more application buffers. These registered buffers which have been copied are then made available. The number of receive credits is updated based on the additional available receive buffers.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings, wherein:

FIG. 3 is a chart listing features of a transport service provider according to an embodiment of the present invention over VI architecture as compared to the features of the legacy transport level protocol TCP.

DETAILED DESCRIPTION

1.0 The VI Architecture

In a traditional network architecture, the operating system (OS) virtualizes the network hardware into a set of logical communication endpoints available to network consumers. The operating system multiplexes access to the hardware among these endpoints. In most cases, the operating system also implements protocols at various levels (e.g., TCP, IP) that make communication reliable. The demultiplexing process and reliability protocols are computationally expensive. Moreover, all communication operations result in buffer copies being made at multiple levels or layers, mode switches and context switches, which can be quite expensive to execute.

The VI Architecture was designed to eliminate buffer copies and kernel overhead that have caused traditional networked applications to be performance bottlenecks in the past.

Figure 1A:
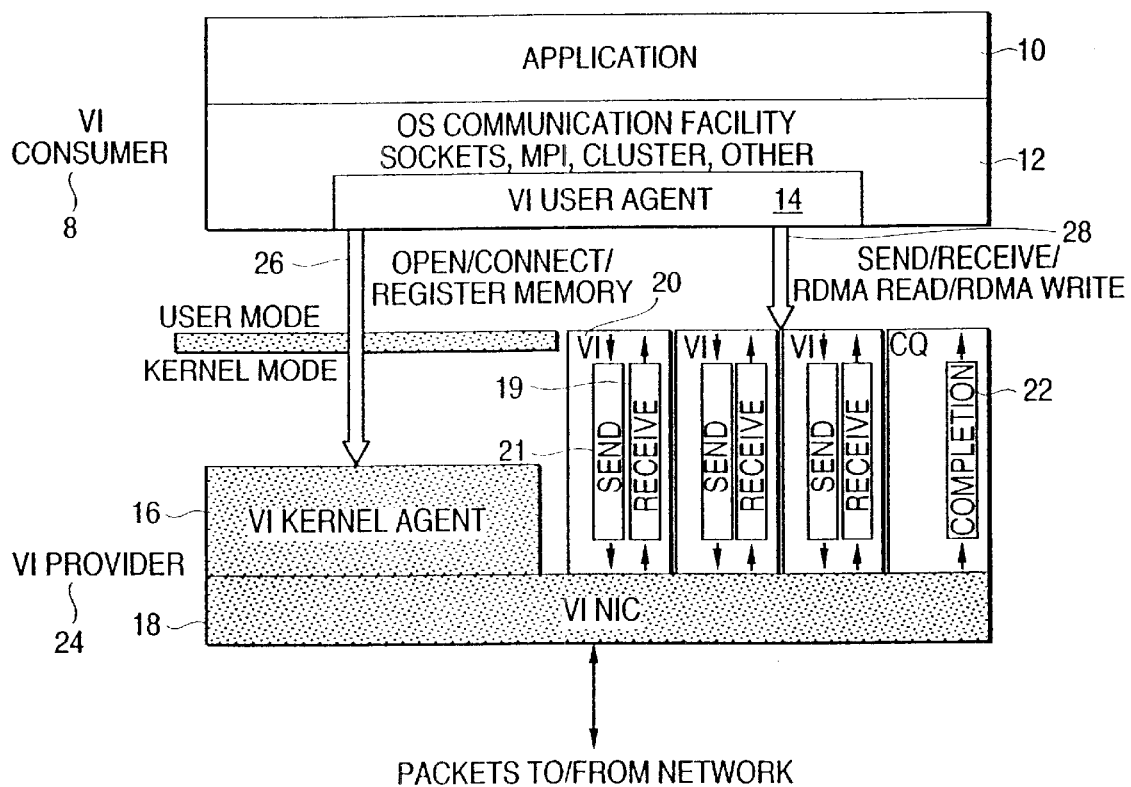
FIG. 1A is a block diagram illustrating the Virtual Interface (VI) Architectural model.

FIG. 1A is a block diagram illustrating the VI Architectural model. The VI architecture will be briefly described. The VI Architecture is a user-level networking architecture designed to achieve low latency, high bandwidth communication within a cluster. To a user process, VI Architecture provides direct access to the network interface in a fully protected fashion. VI Architecture avoids intermediate data copies and bypasses operating system to achieve low latency, high bandwidth data transfer. The VI Architecture Specification, version 1.0, Dec. 16, 1997, was jointly authored by Intel Corporation, Microsoft Corporation, and Compaq Computer Corporation.

As shown in FIG. 1A, the VI Architectural model includes a VI consumer 8 and a VI provider 24. A VI consumer 8 is a software process that communicates using a Virtual Interface (VI). The VI consumer 8 typically includes an application program 10, an operating system communications facility 12 (e.g., Sockets, Remote Procedure Call or RPC, MPI) and a VI user agent 14. The VI provider 24 includes the combination of a VI network interface controller (VI NIC) 18 and a VI kernel agent 16.

Figure 1B:
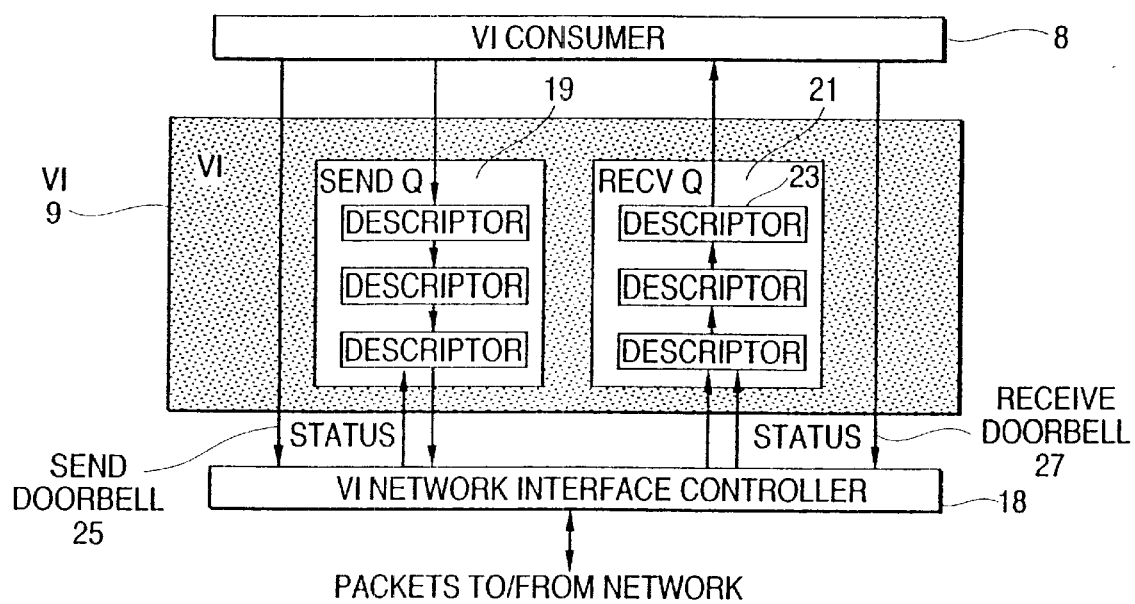
FIG. 1B is a block diagram illustrating a virtual interface (VI).

A block diagram illustrating a virtual interface (VI) is illustrated in FIG. 1B. Referring to FIGS. 1A and 1B, a virtual interface (VI) 9 is an interface between a VI NIC 18 and a process or application (VI consumer 8). The VI 9 allows a VI NIC 18 to directly access the process' memory for data transfer operations between the application and the network. A VI 9 includes a pair of work queues, one for send operations (a send queue 21) and one for receive operations (receive queue 19). The work queues store one or more descriptors 23 between the time it is Posted (placed in the queue) and the time it is Done (when the VI NIC has completed processing it). The descriptor 23 is a data structure recognizable by the VI NIC that describes a data movement request, and it includes a list of segments (a control segment, an optional address segment and one or more data segments). The control segment identifies the type of VI NIC data movement operation to be performed and the status of a completed NIC data movement operation. The data segment describes a communications buffer for a VI NIC data movement operations. A receive queue 19 contains descriptors that describe where to place incoming data. A send queue 21 contains descriptors that describe the data to be transmitted. A pair of VIs are associated using connection primitives (e.g., VipConnectWait, VipConnectAccept, VipConnectRequest) to allow packets sent at one VI to be received at the other VI. A send doorbell 25 and a receive doorbell 27 are provided for allowing the VI consumer to notify the VI NIC 18 that work (a descriptor describing a requested data transfer operation) has been placed in the send queue 19 and receive queue 21, respectively.

Referring to FIG. 1A again, the VI user agent 14 is a software component that enables an operating system communication facility 12 to utilize a particular VI provider 24. The VI user agent abstracts the details of the underlying VI NIC hardware in accordance with an interface defined by an operating system communication facility 12. The VI user agent includes a library of primitives known as the VI primitives library (VIPL) that provide functions for creating a VI (VipCreateVI), for destroying a VI (VipDestroyVI), for connecting one VI to another VI (e.g., VipConnectWait, VipConnectRequest), for accepting or rejecting a VI connection request (VipConnectAccept or VipConnectReject), for terminating or disconnecting a connection between two VIs (VipDisconnect), to allow a process to register process memory with a VI NIC (VipRegisterMem), to post descriptors (to place a descriptor in a VI work queue using, e.g., VipPostSend, VipPostRecv), etc. Details of the VI primitives (VIPL) are set forth in the VI Architecture Specification, version 1.0, Dec. 16, 1997.

The kernel agent 16 is the privileged part of the operating system, usually a driver supplied by the VI NIC vendor, that performs the setup and resource management functions needed to maintain a virtual interface between VI consumers and VI NICs. These functions include the creation/destruction of VIs, VI connection setup/teardown, interrupt management and or processing, management of system memory used by the VI NIC and error handling. VI consumers access the kernel agent 16 using the standard operating system mechanisms such as system calls. As shown by arrow 26 (FIG. 1A), the OS communication facility 12 makes system calls to the VI kernel agent 16 to perform several control operations, including to create a VI on the local system, to connect the local VI to a VI on a remote system, and to register memory. The VI architecture requires the VI consumer to register memory to be used for data transfer prior to submitting the request for data transfer. The memory regions used by descriptors and data buffers are registered prior to data transfer operations. Memory registration gives a VI NIC a method to translate a virtual address to a physical address. The user receives an opaque memory handle as a result of memory registration. This allows a user to refer to a memory region using a memory handle/virtual address pair without worrying about crossing page boundaries and keeping track of the virtual address to tag mapping. Memory registration enables the VI provider to transfer data directly between the registered buffers of a VI consumer and the network. Traditional network transports often copy data between user buffers and one or more intermediate kernel buffers. Thus, processing overhead is decreased in the VI Architecture because data transfers between application and the VI NIC do not rely on system calls to the kernel.

After creating a VI on the local system, connecting the local VI to a remote VI and registering memory, application 10 or operating system communication facility 12 can use data transfer primitives of the VIPL library of VI user agent 14 to send and receive data. The VI Architecture defines two types of data transfer operations: 1) traditional send/receive operations, and 2) Remote-DMA (RDMA) read/write operations. Once a connection is established, the operating system facility 12 posts the application's send and receive requests directly to the local VI (to the send and receive queues). A consumer 8 posts descriptors (e.g., places the descriptors in a work queue) then rings a doorbell to notify the NIC that work has been placed in the work queue. The VI consumer can ring the doorbell (notify the VI NIC 18 of the work in the queue) without kernel processing. The VI NIC 18 then processes the descriptor by sending or receiving data, and then notifies the VI consumer 8 of the completed work using the completion queue 22. The processing of descriptors posted on a VI is performed in FIFO order but there is no implicit relationship between the processing of descriptors posted on different VIs. The VI NIC 18 directly performs the data transfer functions in response to the posted descriptors.

The VI Architecture supports three levels of communication reliability at the NIC level: unreliable delivery, reliable delivery, and reliable reception. With reliable delivery and reception, corrupt data is detected, data is delivered exactly once, data order is guaranteed, data loss is detected and the connection is broken upon detection of an error. While providing high reliability, the VI architecture does not perform other transport level functions, including flow control, buffer management and fragmentation and reassembly. The VI Architecture Specification, version 1.0, Dec. 16, 1997 states at page 15 that "VI consumers are responsible for managing flow control on a connection." The transport service provider of the present invention is designed to provide some transport level functionality over the VI architecture or over an architecture similar to the VI architecture without adding unnecessary overhead.

2.0 Transport Service Provider

Figure 2:
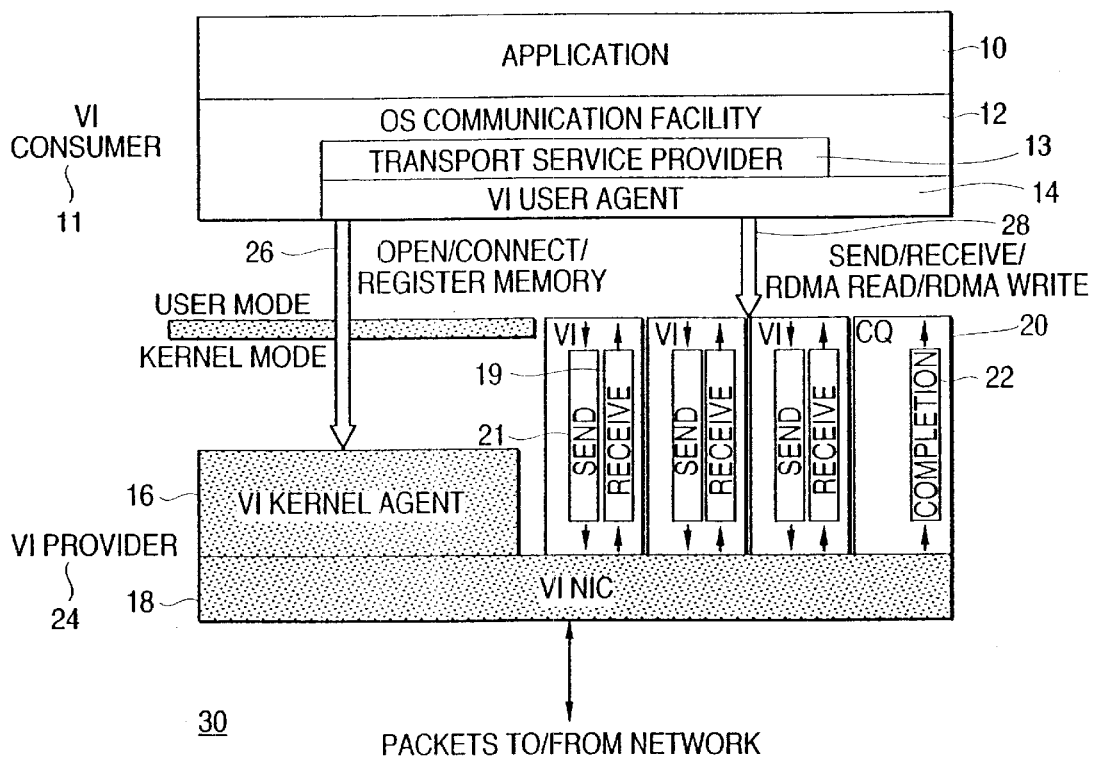
FIG. 2 is a block diagram of an end-point system according to an embodiment of the present invention.

FIG. 2 is a block diagram of an end-point system according to an embodiment of the present invention. End-point system 30 includes a VI consumer 11 and a VI provider 24. VI provider 24 of FIG. 2 is the same or very similar to the VI provider 24 of FIG. 1A. VI consumer 11 of FIG. 2, however, includes a new component, a transport service provider 13, which is coupled between the operating system communications facility 12 and the VI user agent 14. Transport service provider 13 is a communication service that provides a messaging layer for translating application commands or operating system facility commands into the corresponding set of commands and operations using the VI user agent. Transport service provider 13 provides transport like functionality, including flow control, buffer management and fragmentation and reassembly (if necessary) without adding unnecessary overhead.

FIG. 3 is a chart comparing features of a transport service provider 13 according to an embodiment of the present invention over VI architecture with the legacy transport level protocol TCP. TCP is connection oriented, provides a data checksum for error detection provides positive acknowledgments (acks), performs timeouts and retransmissions when an ack is not received, detects duplicates (because packets can be retransmitted), provides sequencing and provides a sliding window flow control. All of these functions are performed by the processor and, therefore, result in significant processor overhead. In contrast, the transport service provider 13 of the present invention provides a credit-based flow control, and relies on the VI NIC (which may be hardware) to provide the other functions listed in FIG. 3.

Before the flow control scheme of the present invention will be described in detail, the general structure and operation of the user-level stack and hardware model designed for VI architecture will first be described. Once the general structure and operation of an endpoint system that employs VI architecture is described, the specific details of a transport service provider, including a flow control service, will be described. The present invention is described below with reference to a sockets type of operating system communication facility over the VI architecture. The sockets communications facility is merely one of several communications facilities available to applications. The transport service provider 13 and the flow control scheme of the present invention are applicable to a wide variety of communication services over VI architecture or an architecture that is similar to the VI architecture. The flow control scheme of the present invention is not limited to the sockets embodiment described below. This sockets embodiment described below is simply provided as an example of an endpoint system that employs a credit-based flow control scheme of the present invention.

3.0 Stream Sockets Over VI Architecture

Figure 4:
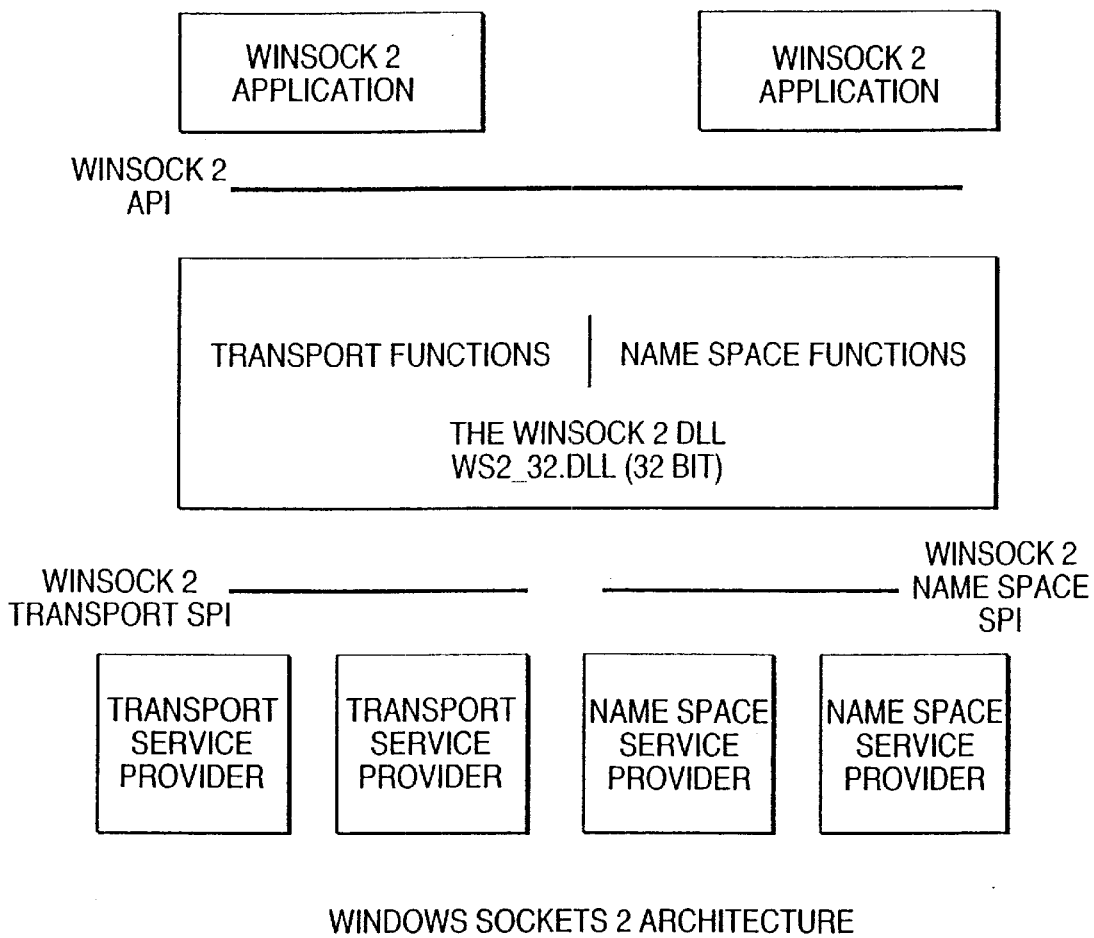
FIG. 4 is a diagram illustrating an overview of Windows Sockets 2 architecture.

Stream sockets provide a connection-oriented, bi-directional byte-stream oriented communication model. Windows Sockets 2 Architecture utilizes sockets paradigm and provides protocol-independent transport interface. FIG. 4 is a diagram illustrating an overview of Windows Sockets 2 architecture. It consists of an application programming interface (API) used by applications and service provider interfaces (SPIs) implemented by service providers. This extensible architecture allows multiple service providers to coexist. The transport service providers implement the actual transport protocols and the name space providers map WinSock's name space SPI to some existing name spaces. Examples of the transport service providers include the Transmission Control Protocol (TCP) which is a connection oriented protocol and User Datagram Protocol (UDP), which is a connectionless protocol. As described in greater detail below, according to an embodiment of the present invention, Windows Sockets 2 Architecture is used to provide high performance stream sockets over VI Architecture that uses a new transport service provider (transport service provider 13, FIG. 2 that is designed to operate over VI architecture). The new transport service provider can be implemented at user-level.

Figure 5:
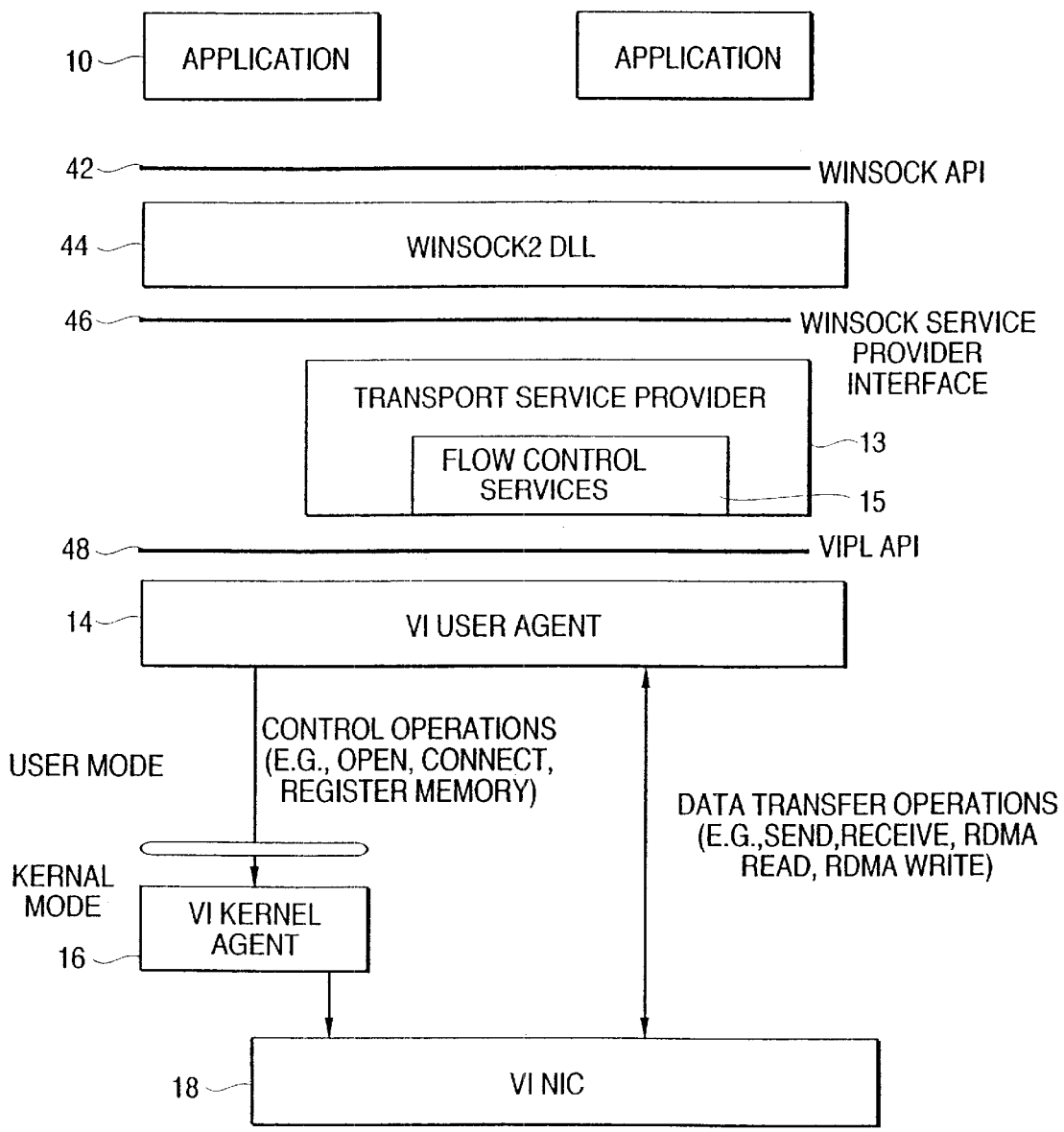
FIG. 5 is a block diagram illustrating a user-level stack optimized for VI Architecture according to an embodiment of the present invention.

FIG. 5 is a block diagram illustrating a user-level stack optimized for VI Architecture according to an embodiment of the present invention. A specific embodiment of the operating system communications facility 12 (FIG. 2) includes a WinSock application programming interface (API) 42, the WinSock Dynamically Linked Library (DLL) 44 and a WinSock Service Provider Interface 46. The transport service provider 13 is a messaging layer that includes transport like functionality. Among other functions, transport service provider 13 includes flow control services 15 for performing flow control, fragmentation and reassembly and buffer management. The VI NIC 18 shown in FIG. 5 include and manage the send and receive queues 21 and 19 (the work queues), respectively (shown in FIG. 2).

An application 10 can use the primitives (or functions) of the WinSock API 42 to issue commands or requests to the WinSock2 DLL 44 for communications services (e.g., to create a socket, to make a connection to another socket, to send data between two sockets). The WinSock2 API primitives allow an application 10 to specify a particular transport service provider that will provide the requested communication services. The transport services available to application 10 could include, for example, TCP, UDP and the transport service provider 13 of the present invention that is designed to operate over VI architecture. Based on the service request or command from the application, the Win- Sock2 DLL identifies the requested transport service provider and issues one or more corresponding commands to the requested transport service provider via the WinSock service provider interface 46.

The transport service provider 13 is a messaging layer that translates each command received from the WinSock2 DLL 44 into one or more appropriate commands or operations for performing the requested operation or service using the VI user agent 14. The commands from the transport service provider are provided to the VI user agent 14 via the primitives of the VI primitive library (VIPL) API 48. The VI user agent 14 receives the VIPL commands from the transport service provider 13 and performs one or more operations or functions corresponding to each VIPL command. As shown in FIG. 5, control operations (such as create socket, connect, etc.) are performed by the VI user agent 14 through system calls to the VI kernel agent 16. For example, in response to a create socket command, the VI user agent creates a VI that is mapped to (or associated with) the socket (each socket is mapped to a VI) and also registers memory for the VI through system calls to the VI kernel agent 16.

Once the VIs are created and connected, the VI user agent 14 can request data transfer operations (such as send and receive) corresponding to data transfer requests from application 10 by directly posting descriptors to the send and receive queues of the corresponding VI, and then waiting or polling for the corresponding completions of the descriptors. After the descriptors are posted (placed in the queues), the VI NIC 18 then performs the requested data transfers described by the descriptors by transferring data directly between registered process memory and the network without intervention of the VI kernel agent 16. By posting descriptors to work queues and transferring data directly between registered process memory and the network without making kernel copies, kernel processing and buffering is removed from the critical data path, thereby significantly reducing processor overhead for data transfer operations.

3.1 Design and Implementation

User-level decentralized protocol processing, credit-based flow control, caching of pinned communication buffers, and minimization of CPU overhead are the main techniques used in stream sockets over VI Architecture implementation, according to an embodiment of the present invention. These techniques along with the design are described next.

3.1.1 Endpoint Mapping and Connection Management

The connection-oriented design provided by VI Architecture maps well to stream sockets. Each stream socket (endpoint) is mapped to a VI. Each endpoint consists of send/receive descriptors, registered send/receive buffers, and information for credit-based flow control. Each endpoint has a queue of received buffers containing data yet to be read by the application. In order to reduce number of memory registrations, global pools of send and receive descriptors are created and registered within a process during service provider initialization. During creation of an endpoint, descriptors are assigned from these global pools. Upon destruction of an endpoint, descriptors are returned back to the global pools. A queue of pending connection requests is maintained at each endpoint. A dedicated thread manages connection requests on the endpoint. IP port numbers are used as discriminators in underlying connection establishment between VIs.

3.1.2 Data Transfer and Transport Level Services

The reliability mode used in data transfers is reliable delivery (offered by the VI Architecture). Reliable delivery VI guarantees that the data submitted for transfer is delivered exactly once, intact, and in the order submitted, in the absence of errors. Transport errors are extremely rare and considered catastrophic. In network interfaces that emulate VI functionality, reliable delivery can be implemented in NIC firmware or software. In native VI NICs (such as the GNN1000 of the cLAN product family, available from GigaNet, Inc.), the hardware provides reliable delivery. Due to the use of reliable delivery VIs, fragmentation of messages can be handled without using sequence numbers. Furthermore, the transport service provider 13 need not worry about managing acknowledgments and detecting duplicates. Timeout and retransmission mechanisms are not incorporated in the transport service provider 13 as transport errors are rare and connection is broken when transport errors occur.

Three types of messages used in data transfer are Credit Request, Credit Response, and Data. The transport service provider 13 is responsible for managing end-to-end flow control between two endpoints using these messages. For providing end-to-end flow control, a credit-based scheme is used. Details of the credit-based flow control scheme are described below in section 3.4.1.

3.1.3 Descriptor Processing

In VI Architecture, a data transfer operation is split into two phases: initiation of the operation (posting a descriptor) and completion of the operation (polling or waiting for a descriptor to complete on a work queue). Due to push model of processing and high-speed reliable SANs, send descriptors complete quickly once they reach the head of the send queue. So in order to reduce interrupts, polling is used for checking completion of send descriptors, according to one embodiment of the present invention. Checking completion of a send descriptor is deferred until either there are not enough send credits available or the entire message is posted. This type of deferred de-queuing of send descriptors reduces processor or CPU overhead compared to when polling immediately after posting each send descriptor.

The transport service provider 13 maintains a small-sized least recently used (LRU) cache (e.g., internal buffers 75, described for FIG. 7 below) of registered application buffers. This allows zero-copy sends for frequently used application buffers. The application data is copied into pre-registered send buffers (e.g., buffers 75, FIG. 7) only when the application buffer (76, FIG. 7) is not found in the cache and is not added to the cache. To allow application specific tuning, the maximum number of LRU cache entries and the minimum size of registered application buffer are kept configurable.

Receive descriptors need to be pre-posted prior to posting of the matching send descriptors on the sender side. The data is always copied from the registered receive buffers to the buffers supplied by the application for receiving data. The copying of data on the receiver side can be overlapped with VI NIC processing and physical communication. The receiver waits when there is no data available on the socket. When the receiver wakes up due to completion of a receive descriptor, the receiver de-queues as many completed receive descriptors as possible. This scheme for processing receive descriptors reduces the number of interrupts on the host system.

The transport service provider 13 for stream sockets over VI Architecture was implemented at user-level. This allows decentralized protocol processing on per process basis. The user-level buffer management and credit-based flow control scheme do not experience a kernel like restrictive environment. The communication subsystem becomes an integrated part of the application and this allows for an application specific tuning. The next subsection provides experimental evaluation of stream sockets over VI Architecture.

3.2 Experimental Evaluation

In the experiments involving micro-benchmarks, a pair of server systems, with four 400 MHz Pentium®II Xeon™ processors (512K L2 cache), Intel AD450NX 64-bit PCI chipset, and 256 MB main memory, was used as a pair of host nodes. GigaNet's cLAN™ GNN1000 interconnect (full duplex, 1.25 Gbps one-way) with VI functionality implemented on NIC hardware is used as VI NIC 18. The software environment used for all the experiments included Windows NT™ 4.0 with service pack 3 and Microsoft Visual C++6.0. As default, the Maximum Transfer Unit (MTU) per packet used by the stream sockets over VI Architecture was 8K bytes and credit-based flow control scheme reserved an initial receive credits of 32 for each connection. Unless stated, all the experimental results were obtained using these default values.

3.2.1 Round-Trip Latency

Figure 6:
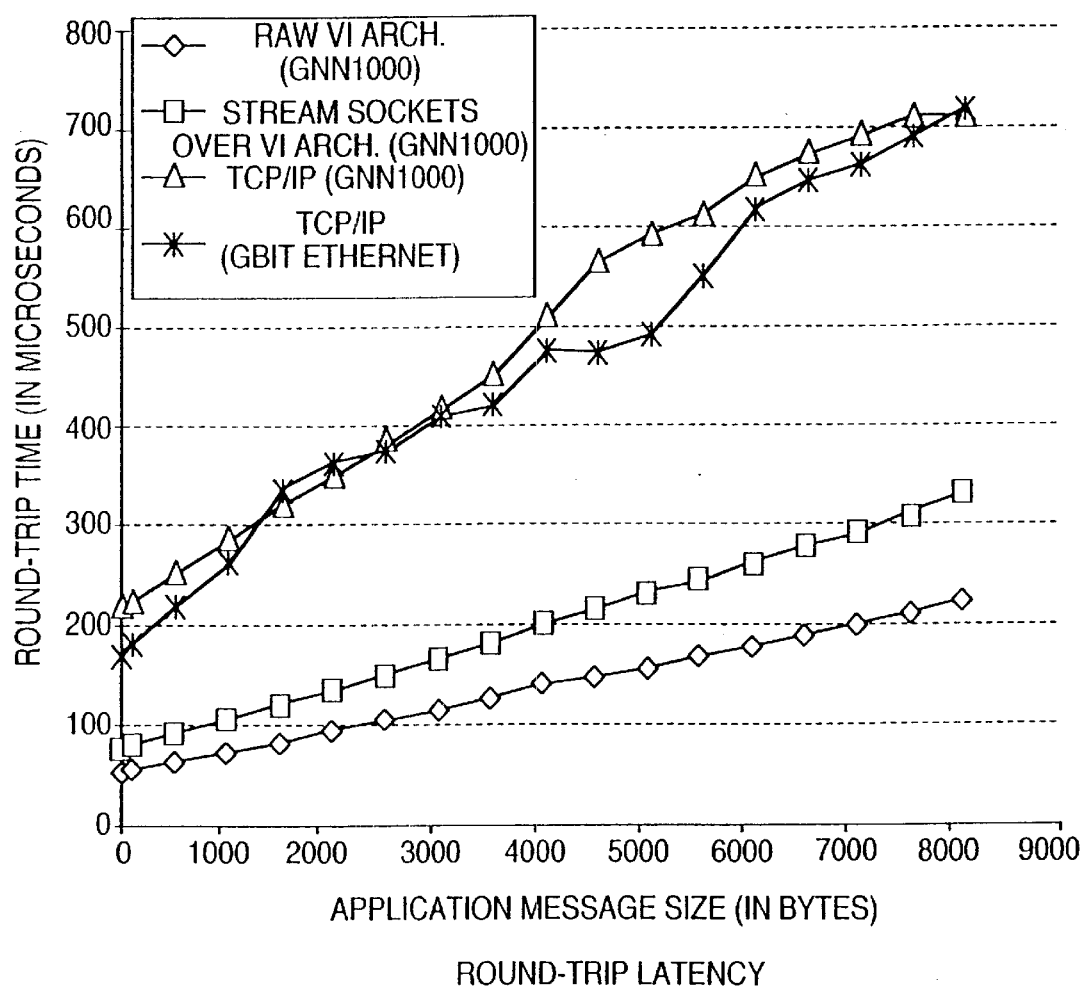
FIG. 6 is a graph comparing the application-to-application round-trip latency.

In distributed applications, round-trip latencies of small messages play an important role in the performance and scalability of the system. In order to measure round-trip latency, a ping-pong test was used in the experiments. FIG. 6 is a graph comparing the application-to-application round-trip latency achieved (averaged over 10000 runs) by raw VI Architecture primitives (e.g., where the application makes direct calls to the VI architecture primitives such as VipPostSend, VipPostRecv, VipSendDone, VipSendWait, VipRecvWait, etc.), stream sockets over VI Architecture (GNN1000), TCP/IP over Gigabit Ethernet, and TCP/IP over GNN1000. The round-trip latency achieved by stream sockets over VI Architecture is 2–3 times better than the round-trip latency achieved by both TCP/IP over Gigabit Ethernet and TCP/IP over GNN1000. Moreover, the average round-trip latency achieved for a given message size is within 50% of the round-trip latency achieved using raw VI architecture primitives.

Sockets (e.g., WinSock2) is merely one type of operating system communications facility that can be used to interface applications to the VI architecture. Many other communication facilities can be similarly used to interface between an application and a service provider over VI architecture. For example, Microsoft Remote Procedure Call (MSRPC) can be used as the communications facility. Additional details regarding the stream sockets over VI architecture implementation and an RPC over VI architecture implementation can be found in Hemal V. Shah, et al., "High Performance Sockets and RPC Over Virtual Interface (VI) Architecture," Proceedings of the Third Workshop on Communication, Architecture, and Applications For Network-Based Parallel Computing, (CANPC '99), Jan. 9–10, 1999, incorporated by reference herein.

3.3 Hardware Model of an Endpoint System

Figure 7:
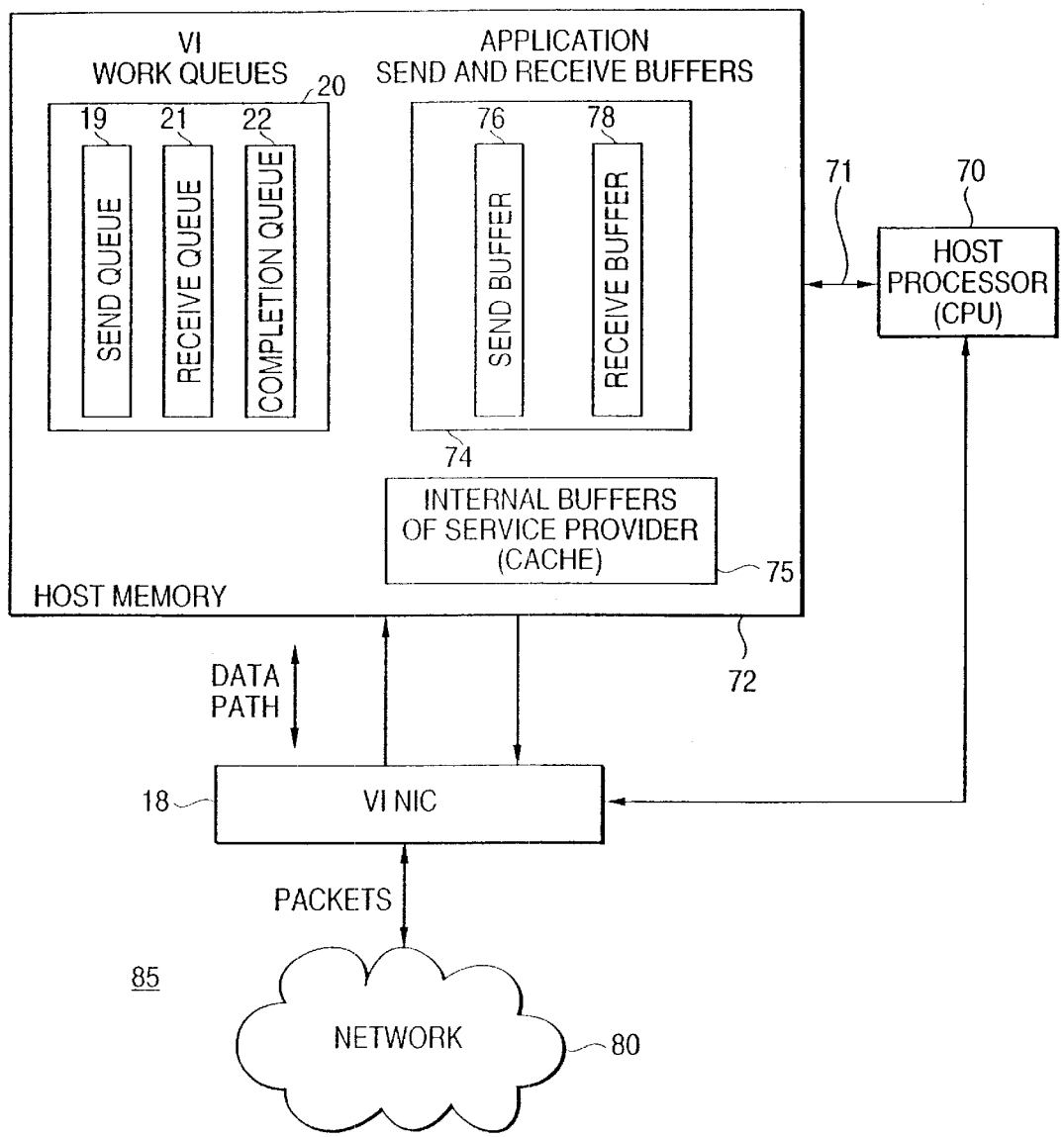
FIG. 7 is a block diagram of the hardware model of an endpoint system according to an embodiment of the present invention.

FIG. 7 is a block diagram of the hardware model of an endpoint system according to an embodiment of the present invention. Endpoint system 85 includes a host processor (or CPU) 70 for controlling operation of the endpoint system 85. A host memory 72 is coupled to the host processor 70 via host bus 71. A VI NIC 18 is coupled to host memory 72, to host processor 70 and to a network 80. A portion of host memory 72 is allocated for the VI work queues 20, including send queue 19, receive queue 21 and completion queue 22. Send and receive queues could also be located in the VI NIC 18. Send and receive queues 21 and 19 are used to store descriptors that describe work (e.g., data transfer operations) to be performed by the VI NIC 18.

A portion of host memory 72 is also allocated for application send buffers 76 and application receive buffers 78 and service provider internal buffers 75. Send and receive buffers 76 and 78 and internal buffers 75 can be registered with the VI NIC 18. Once the buffers are registered, the VI NIC 18 can transfer incoming data directly from network 80 to a receive buffer 78, and outgoing data can be directly transferred from a send buffer 76 to the network. The data transfer operations are performed by the VI NIC 18 without making system calls to the kernel and without making intermediate copies (such as kernel copies) of the data.

However, according to one embodiment of the present invention, only the send buffers 76 and the internal buffers 75 of FIG. 7 are registered with the VI NIC 18. In such case, data is typically transferred directly from registered send buffers 76 to the network for a send operation. For receive operations, the receive buffers 78 in the application memory space may not be registered. In fact, the application may not initially inform the service provider 13 of which application memory buffers should be used for storing the data when the application requests the receive operation. As a result, the internal buffers 75 of the transport service provider can be provided and registered to provide a registered receive buffer for storing data when the data is received in response to a completed receive descriptor (when the receive operation is completed). The received data can then be subsequently transferred to the unregistered application receive buffers 78. Internal buffers 75 can also be used as the registered memory buffer for sending data if the send buffers are not found in cache.

3.4 Operation of an End-Point System using Stream-Sockets over VI Architecture A VI is created by a VI provider at the request of a VI consumer. A VI includes a pair of work queues (send and receive queues) and a pair of doorbells, one for each work queue. The VI Architecture provides connection-oriented data transfer service. When a VI is initially created, it is not associated with any other VI. A VI must be connected with another VI through a deliberate process in order to transfer data.

Figure 8:
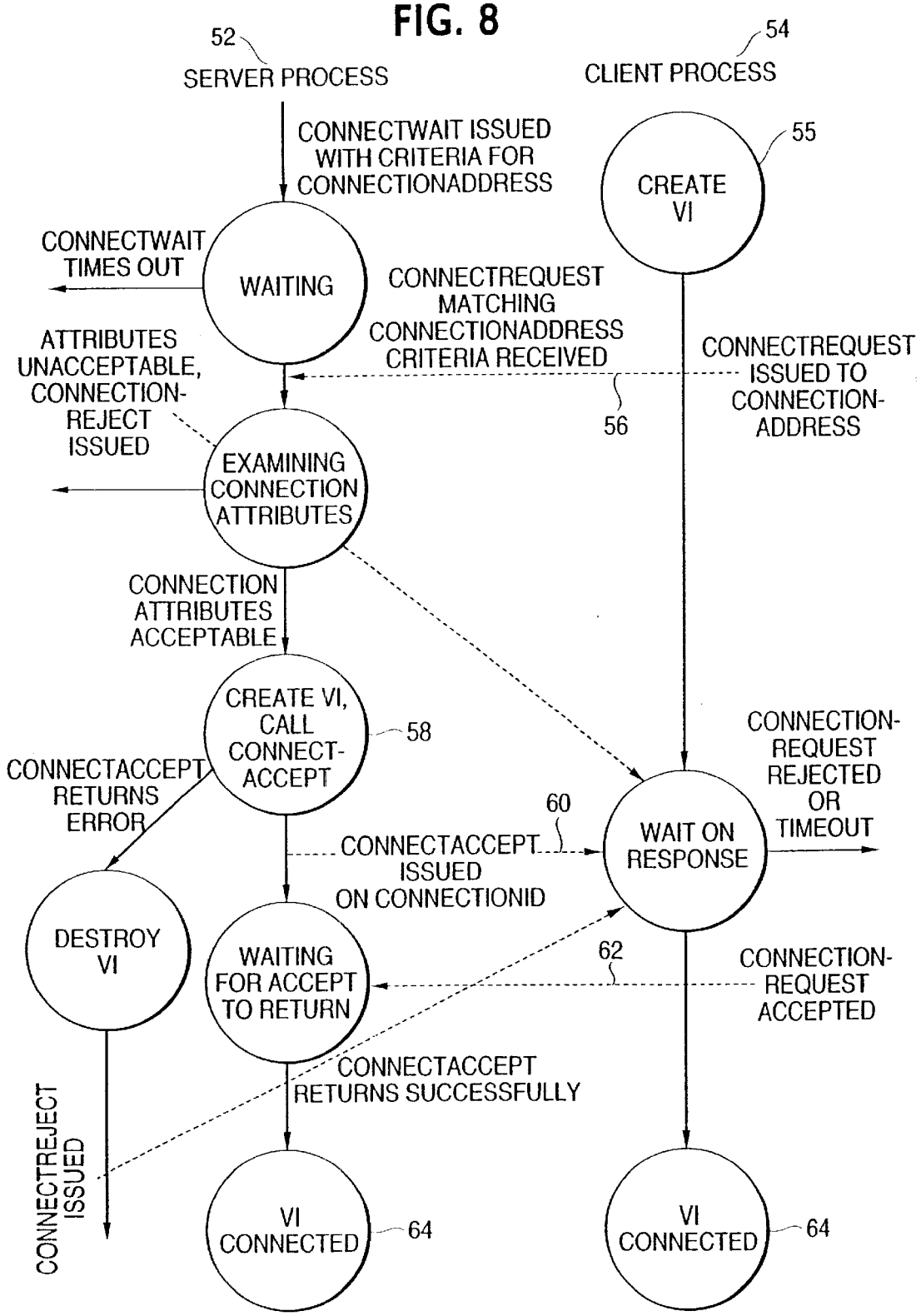
FIG. 8 is a diagram illustrating the connection process between two endpoints in the VI architecture.

FIG. 8 is a diagram illustrating the connection process between two endpoints in the VI architecture. The endpoint association model in the VI architecture is a client-server model. A client process 54 and a server process 52 are shown. The client process 54 creates a VI, step 55, and then issues a connection request via line 56. The server process 52 waits for incoming connection requests and then either accepts them or rejects them. If a received connection request is acceptable, the server process 52 creates a VI, step 58, and issues a connect accept via line 60. The client process 54 then receives the connect accept and issues an acknowledgment or return on line 62. The connection between the client and server processes (VIs) is now established, step 64.

Before data can be transferred between two endpoints, several operations must be performed to create the appropriate sockets and VIs, register send memory buffers (for sending data directly to the network), register receive memory buffers (for receiving data directly from the network), and establish a connection between two endpoints, etc. A client application at an endpoint creates a socket and initializes the transport service provider (including opening a VI NIC). The transport service 13 for the client endpoint creates a VI associated with the socket and registers memory for both send buffers and receive buffers. Next, the client requests a connection to a remote endpoint application. Some of the seps performed at the different levels to create a socket will now be briefly described to provide an example. Referring to FIG. 5, an application 10 (e.g., operating as a client process) calls WSASocket (domain, type, protocol). WSASocket ( ) is a command or primitive from the WinSock API 42 (FIG. 5). The type of socket is specified as stream socket (as opposed to a datagram socket), the domain is specified as AF_INET (the internet), and the protocol is specified as Transport_Service_Provider_Over_VI, which refers to the transport service provider 13 of the present invention that is designed to operate over the VI architecture. The WinSock2 DLL calls WSPSocket (. ..) of the transport service provider 13. WSPSocket (..) is a command from the WinSock service provider interface 46 (FIG. 5). In response to the WSPSocket (..) command, the transport service provider performs several functions and makes several calls to the VI user agent 14 using the primitives of the VIPL API 48. The transport service provider creates a VI associated with this socket using the VipCreateVi (..) primitive (of the VIPL API 48), allocates a local pool of application receive buffers and send buffers and registers this application memory using the VipRegisterMem(. .) VIPL primitive and pre-posts receive descriptors using the VipPostRecv(..) VIPL primitive. Other functions are also performed by the user agent. Details of the operations performed by the Transport Service provider 13 for stream sockets over VI architecture according to an embodiment of the present invention are described in Appendix B within this specification. The operations described in Appendix B include initialization, socket creation, socket destruction, connecting to another socket, listening for connection requests, accepting a connection request, and send and receive operations.

3.4.1 Flow Control and Send and Receive Operations

After a VI (associated with the socket) has been created and connected to another VI, data may be transferred between the sockets over the VI architecture. When an application wants to send data on a particular socket, the application calls WSASend (. .). The WinSock2 DLL then calls WSPSend (. ..) of the transport service provider 13. The service provider 13 then performs the steps shown in the flow charts of FIGS. 9 and 10 to send data to another socket, according to an embodiment of the present invention.

Similarly, when an application would like to receive data from a socket, the application calls WSARecv (. ..). The WinSock2 DLL 44 calls WSPRecv of the transport service provider 13. The service provider 13 then performs the steps shown in FIGS. 11 and 12 to receive data from a socket (or other endpoint) according to an embodiment of the present invention.

The send and receive operations illustrated in FIGS. 9–12 provide transport like functionality including flow control, fragmentation and reassembly and buffer management without adding unnecessary overhead. For example, as illustrated in FIG. 3, the credit-based flow control scheme according to an embodiment of the present invention does not detect data errors, provide positive packet acknowledgment, perform timeout and retransmission, detect duplicate packets, or provide packet sequencing because these functions are provided by the VI NIC. The send and receive operations illustrated in FIGS. 9–12 provide a synchronous credit-based flow control scheme where credit updates are sender-initiated.

The following notations and assumptions are made according to one embodiment of the send and receive operations.

Notations
s—a socket
RecvCredits—the number of buffers available for receiving data
SendCredits—the number of receive buffers available at the other end (sender's view)
buf—an application buffer
len—the length of buf (in bytes)
MTU—the maximum transfer unit
PendingCreditResponse—a boolean indicating whether there is a pending credit response
send(s,buf,len)—send len bytes of data from buf on socket s
receive(s,buf,len)—receive up to len bytes in buf on socket s
RecvCredits of one application corresponds to SendCredits of the connected application, and vice-versa.

Assumptions

Each user-level stream socket is mapped to a VI.

The mode used by each VI is reliable delivery. In this reliability mode, the data submitted for transfer will arrive at its destination exactly once, intact, and in the order submitted, in the absence of errors. Transport errors are rare and considered catastrophic. The connection is broken upon detection of any transport error.

The Maximum Transfer Unit (MTU) used by both endpoints is same (and is negotiated during connection establishment).

Before the connection establishment between two endpoints, some finite number of registered receive buffers (each of MTU size) are pre-posted on both ends.

The initial value of SendCredits is 0.

SendCredits, indicating the number of application buffers available at the other endpoint for receiving data, is initialized to zero at socket creation. Thus, initially, the endpoint system is unable to send data to the other endpoint. RecvCredits, indicating the number of registered receive buffers 75 at this endpoint (for receiving data from the other endpoint) is also initialized to some value, such as 32, at socket creation.

At any given time, the number of threads performing send operation on a socket is 1. Similarly, for performing receive operations on a socket, the number of threads active at any given time is at most 1.

For the receive operations, the data is copied from internal registered receive buffers (e.g., buffers 75, FIG. 7) to application buffers (e.g., application receive buffers 78, FIG. 7). While for the send operations, a cache (e.g., buffer 75) of registered application buffers is maintained to allow zero-copy send operations.

These assumptions are provided simply as an example. Other assumptions or conditions can be made as well. The present invention is not limited to the assumptions or notation described herein.

Three types of messages used in data transfer are Credit Request, Credit Response, and Data. The transport service provider 13 is responsible for managing end-to-end flow control between two endpoints. For providing end-to-end flow control, a credit-based scheme is used. If the number of send credits is sufficient, then the sender prepares and sends the packet. Otherwise, the sender sends a credit request (Credit Request) and waits for a credit response (Credit Response). Upon receiving the corresponding credit response, it continues sending packets. In response to sender's request for credit update, the receiver sends the credit response only when it has enough receive credits (above a threshold value or low water mark). In case of not having enough credits when the credit request arrives, the receiver defers the sending of credit response until sufficient receive credits are available (greater than the low water mark). This credit-based flow control scheme and fragmentation and reassembly are implemented through the send and receive operations shown in FIGS. 9–12. As set forth in the flow charts of FIGS. 9–12, the only registered receive buffers are the internal buffers 75 (FIG. 7) of the service provider. In the embodiment described in FIGS. 9–12, the application receive buffers 78 are typically not registered. Send buffers 76 are registered. As a result, received data associated with receive descriptors are placed in the internal buffers 75, and then the data is marked as unread by the application (e.g., the data is enqueued).

Figure 9:
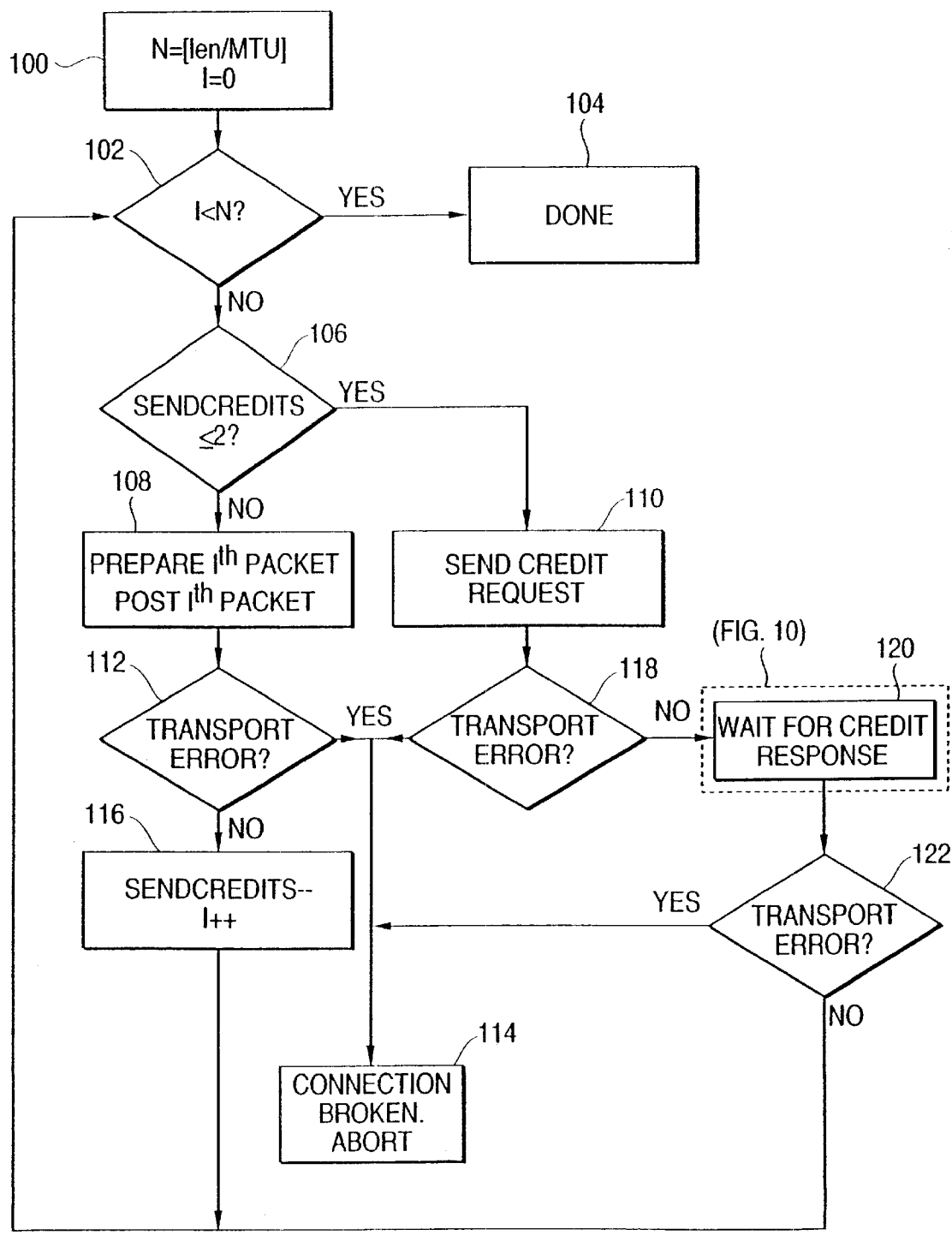
FIG. 9 is a flow chart illustrating operation of a send operation according to an embodiment of the present invention.

The send operation illustrated in FIGS. 9 and 10 will now be described. FIG. 9 is a flow chart illustrating operation of a send operation according to an embodiment of the present invention. The send operation of FIG. 9 sends a length (len) of bytes of data from a send buffer 76 (buf) on a socket s (or other endpoint), where len indicates the length of the data to be sent.

Referring to FIG. 9, several values or variables are initialized at step 100. The variable N is initialized to [buffer length/MTU]. If the buffer length (len) is greater than the maximum transfer unit (MTU), the message will need to be fragmented into N packets for sending over the socket. The send operation automatically performs fragmentation. If the buffer length is less than the MTU, then N is initialized to 1. Thus, N indicates the number of packets required to send a message. The variable I, indicating the packet number is initialized to zero.

At step 102, if I is less than N, meaning that all packets for the message have not been sent, the process proceeds to step 106. Otherwise, if all packets for the message have been sent (I is greater than or equal to N at step 102), then the send operation is done and proceeds to step 104.

At step 106, the endpoint system determines whether SendCredits is less than or equal to two. At least two registered receive buffers 75 must be maintained at the other endpoint to allow the endpoint to send a packet requesting additional SendCredits (a Credit Request). If SendCredits is less than or equal to two, the process proceeds to step 110. Otherwise, if SendCredits is greater than two (meaning there is sufficient receiver buffers at the other endpoint), the process proceeds to step 108.

At step 108, the endpoint system has enough send credits to send a packet. The end point system therefore, prepares and posts a descriptor for the $I^{th}$ packet. This is done by preparing a descriptor for the packet send operation and then posting the descriptor on the send queue 19. The descriptor describes the data transfer operation, including the address or location of the memory buffer storing the data to be sent. Posting can be performed by the transport service provider 13 using the VipPostSend(. .) primitive of the VIPL API 48 (FIG. 5). After placing work in a send queue, the VI consumer 8 of the endpoint system submits the descriptor for processing or notifies the VI NIC 18 that work has been placed in the send queue 19 (FIGS. 1A, 1B and 2) by ringing the send doorbell 25 (FIG. 1B). The VI NIC 18 processes the descriptors in the send queue in a FIFO fashion. To process this send descriptor, the VI NIC 18 transfers the data described by the descriptor directly from the registered send memory buffer to the network without making any intermediate copies, without intervention of the host processor 70 (FIG. 7) or system calls to the VI kernel agent 16 (FIG. 2). The VI NIC 18 includes memory buffers. In transferring the data, the VI NIC 18 must copy the data directly from the send memory buffers 76 (FIG. 7) of the application to the VI NIC buffers before transferring the data to the network 80 (FIG. 7). However, no intermediate data copies are made.

At step 112, it is determined whether the descriptor for the $I^{th}$ packet was successfully posted on the send queue 21. If it was not successfully posted, a transport error will be returned, indicating that the connection is broken and the operation is then aborted, step 114. Because the VI architecture provides reliable delivery, successfully posting a descriptor indicates that the packet will very likely be successfully processed by the VI NIC 18 (e.g., the data should be successfully sent).

If there is no transport error (e.g., the descriptor for the packet was successfully posted), the packet count variable I is incremented by one to indicate the next packet and SendCredits is decremented by 1, step 116.

Flow proceeds back to step 102 where I is compared to N to determine if there are additional packets to be sent. If there are additional packets to be sent for this message, then the process proceeds to step 106 where again it is determined if there are sufficient SendCredits. This loop from steps 102, 106, 108, 116 continues to prepare and post descriptors to send all of the packets for the message. If SendCredits is less than or equal to two, there are insufficient receive buffers at the other endpoint and the process proceeds to step 110.

At step 110, a Credit Request is sent to the other endpoint. This is done by generating a Credit Request (e.g., a packet that requests credit from the endpoint), storing the Credit Request in an immediate data field of a send descriptor and then posting the descriptor for the Credit Request to the send queue 21. The VI NIC 18 will process this descriptor. At step 118, if the descriptor for the Credit Request was not successfully posted, an error will be returned to the VI consumer and the operation is aborted, step 114.

If the descriptor for the Credit Request was successfully sent, then the flow proceeds to step 120 where the endpoint system waits for a Credit Response. A Credit Response is a packet from the other endpoint that indicates that additional registered receive buffers are available for receiving data and that the endpoint's SendCredits can thus be increased.

At step 122, if the Credit Response is successfully received, flow then proceeds back to step 102. Otherwise, if an error is returned, the operation is aborted, step 114.

Figure 10:
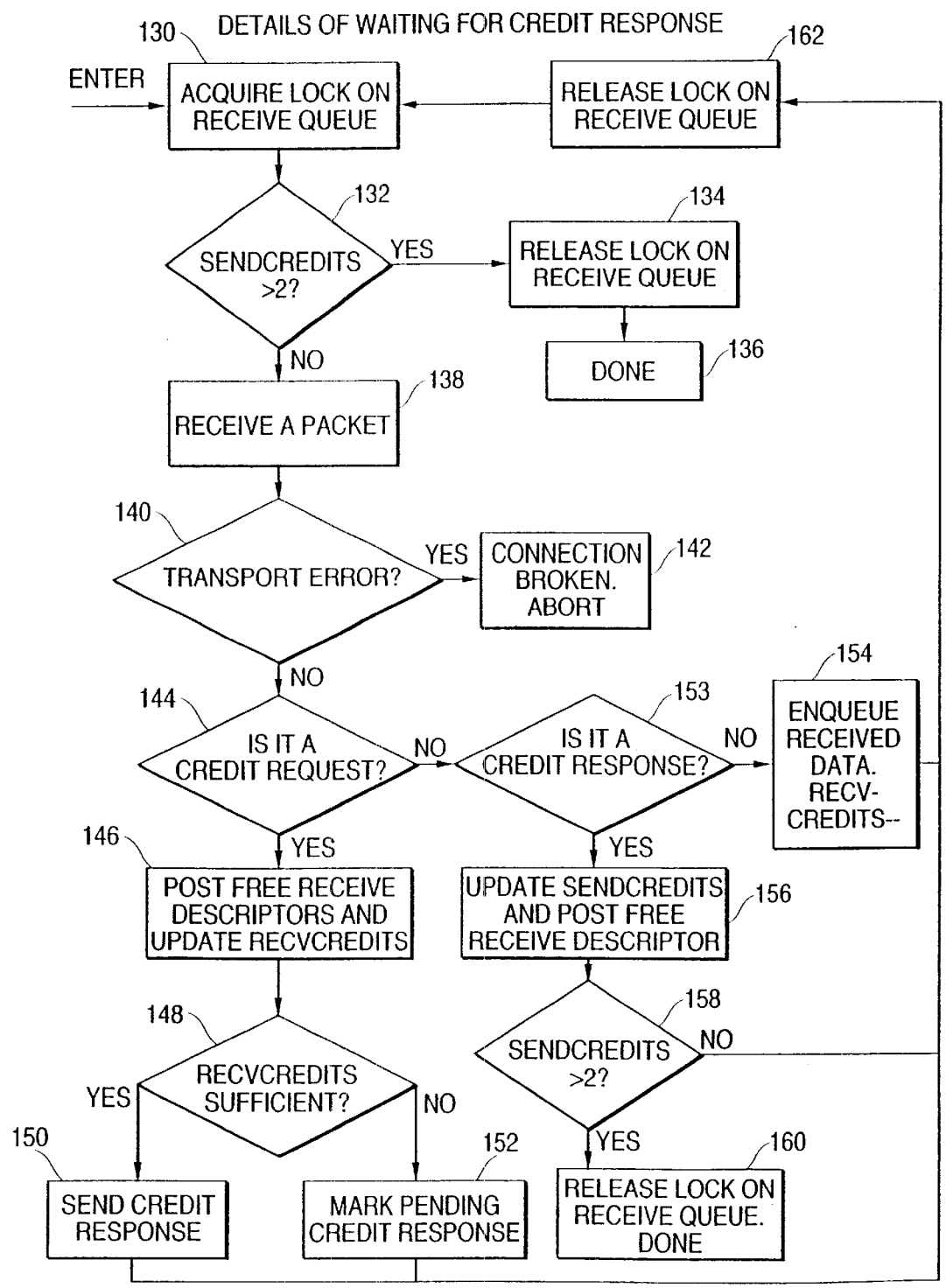
FIG. 10 is a flow chart illustrating details of waiting for a Credit Response of the send operation of FIG. 9.

FIG. 10 is a flow chart illustrating details of waiting for a Credit Response of the send operation of FIG. 9, step 122. Each socket is two-way. Similarly, each VI is two-way, having both send and receive queues. An application will not have two threads or processes of the application sending data using the same send queue 21. Each receive queue 19 may be a shared resource. One thread could be trying to receive data over a receive queue, while another thread that is sending data may be expecting to receive a Credit Response over the same receive queue. To avoid this type of contention, a process or endpoint may first acquire a lock on (exclusive access to) the receive queue 19 through a system call to the VI kernel agent 16 before reading data from the receive queue 19.

Three different types of packets can be received. The endpoint system can receive a descriptor for a Credit Response from the other endpoint (sent in response to a Credit Request). The receive queue 19 can receive a descriptor for Data received from the other endpoint. And, the receive queue 19 can receive a descriptor for a Credit Request from the other endpoint. Thus, the endpoint system should acquire a lock on the receive queue 19 before determining whether a Credit Response has been received, step 130.

At step 132, the endpoint system determines whether SendCredits is greater than two (e.g., determines whether SendCredits was updated while waiting for a Credit response or while acquiring a lock on the receive queue). If SendCredits is greater than two (meaning that sufficient registered receive buffers 75 are available at the other endpoint), the lock on the receive queue 19 is released, step 134, and flow proceeds back to step 102 of FIG. 9.

However, if at step 132, SendCredits is not greater than two, the process proceeds to step 138 where an incoming packet is received. This is done by waiting for a receive descriptor to complete. At step 140, if an error results, then the operation is aborted, step 142. If the packet is received without error, the endpoint must determine whether the received packet is a Credit Response, a Credit Request or Data.

At step 144, the system determines if the packet is a Credit Request. If the packet is a Credit Request, this indicates that the other endpoint would like to send data but has insufficient SendCredits and flow proceeds to step 146.

As a receive descriptor is completed by the VI NIC 18 (e.g., as the requested data is received and stored in a registered receive buffer 75), the receive descriptor is dequeued (e.g., removed) from the receive queue 19. This descriptor is now free because the corresponding registered receive buffer 75 is available. At step 146, the system then re-posts the free (or unused) receive descriptor(s) to the receive queue 19 and updates RecvCredits to reflect the additional registered receive buffers 75 that are now available to receive data.

At step 148, the endpoint determines whether the value of RecvCredits is sufficient. In other words, the endpoint determines whether the value of RecvCredits is greater than some threshold value. If RecvCredits is greater than the threshold value, a Credit Response is sent to the other endpoint, step 150, and then flow proceeds to step 162.

If RecvCredits is not sufficient at step 148, the Credit Response is marked as pending at step 152. This indicates that a Credit Response should be sent later after sufficient free receive descriptors are posted and the RecvCredits is updated to be greater than the threshold value. Flow proceeds next to step 162.

At step 144, if the received packet is not a Credit Request, the endpoint then determines whether the packet is a Credit Response, step 153. If the packet is not a Credit Response, then the packet is a Data packet, and the data is enqueued and RecvCredits is decremented by 1 to reflect the fact that an additional registered receive buffer 75 is in use (is unavailable). According to an embodiment, the term enqueued means that the registered receive buffer (e.g., internal buffer 75, FIG. 7) is marked as being unread by the application.

At step 153, the endpoint determines if the packet is a Credit Response (which the endpoint has been waiting for). If the packet is a Credit Response, the value of SendCredits is updated (incremented or increased) at step 156 based on the Credit Response (to indicate additional receive buffers at the other endpoint). The descriptor that was used for the received Credit Request is re-posted to the receive queue 19.

At step 158, the endpoint determines whether the updated value of SendCredits is greater than 2. If SendCredits is greater than 2, the lock on the receive queue is released and the flow returns to step 102 to prepare and send additional packets as necessary.

If the received packet is either a Data packet or a Credit Request, the flow proceeds to step 162, where the lock is released. Next, the operation proceeds back to step 130 where steps 130–160 are repeated. In steps 130–160, a packet is received and checked whether the packet is a Credit Response. If sufficient send credits are obtained (via the Credit Response), then the process of FIG. 10 is finished and returns to step 102 of FIG. 9. Otherwise, if the packet is not a Credit Response of a sufficient value, then the process continues to receive and process additional packets until a sufficient Credit Response is received.

Figure 11:
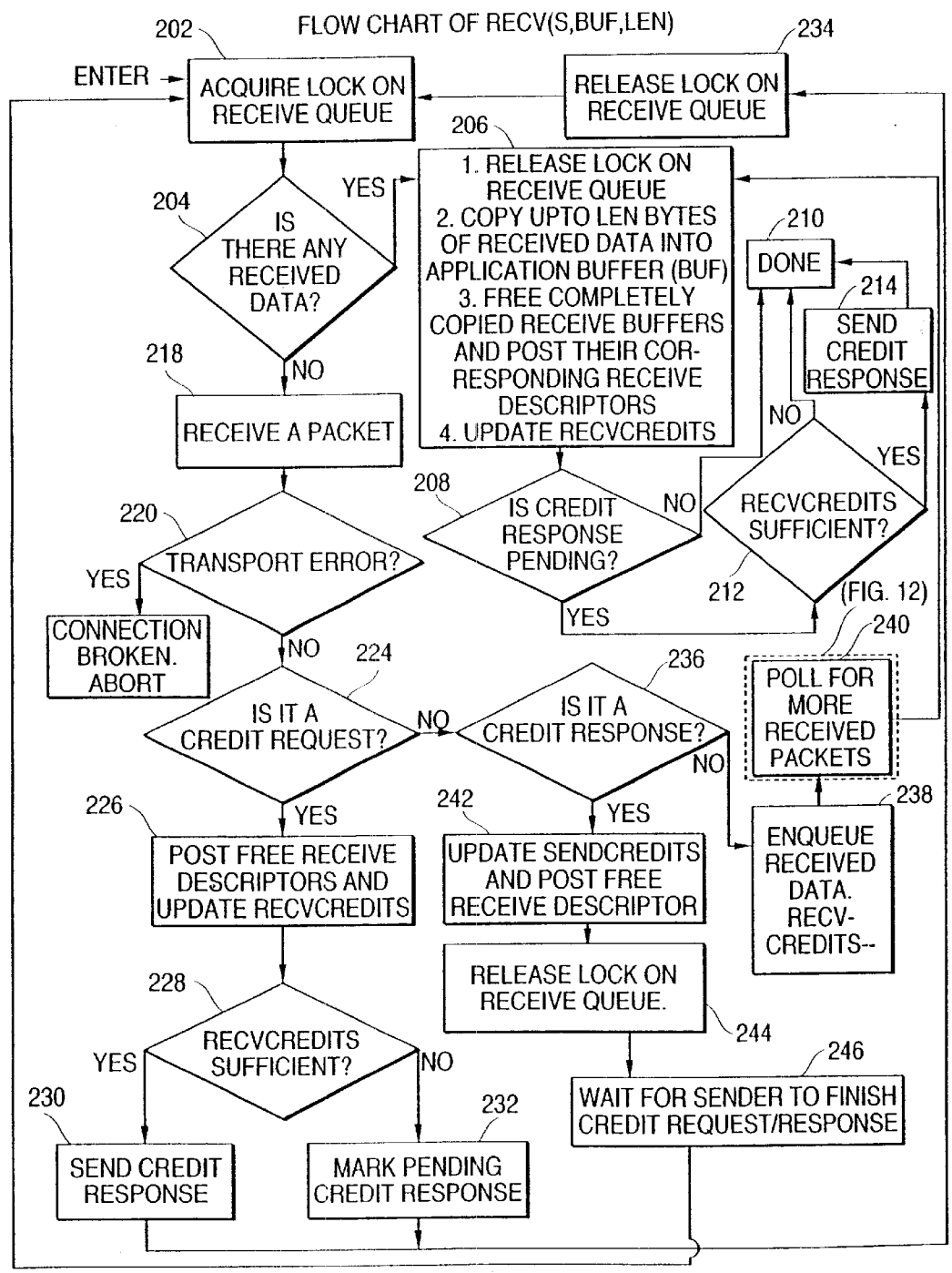
FIG. 11 is a flow chart illustrating a receive operation according to an embodiment of the present invention.

The receive operation illustrated in FIGS. 11 and 12 will now be described. FIG. 11 is a flow chart illustrating a receive operation according to an embodiment of the present invention. The receive operation of FIG. 11 receives up to a length (len) of bytes of data on an application receive buffer 78, FIG. 7 (buf) on a socket s (or endpoint), where len indicates the length of the data to be received.

Referring to FIG. 11, at step 202, the system acquires a lock on the registered receive queue 75. At step 204, the system determines if their is any data that has been received and stored in the registered receive buffers 75 and listed as unread (determines if there is any enqueued data). The endpoint system maintains a linked-list of the enqueued data (a list of the data that has been received and stored in buffers 75 and which is marked as unread by the application). If there is any enqueued data stored in registered receive buffers 75, flow proceeds to step 206.

At step 206, the endpoint system performs four functions. 1. The lock on the receive queues 75 is released. 2. The data in the registered receive buffer 75 is copied into the application receive buffer 78. 3. Once the data is copied from a registered receive buffer(s) 75 into an application receive buffer 78, the corresponding receive descriptor(s) is made available. This descriptor(s) corresponding to the free (available) registered receive buffer(s) 75 is then re-posted on the receive queue 19. 4. The RecvCredits is updated (e.g., incremented) to indicate that one or more additional registered receive buffers 75 are now available to receive data.

Next, at step 208, the endpoint system determines whether a credit response is pending. If no credit response is pending, then the receive operation is done, step 210. Otherwise, if a credit response is pending, the system determines if RecvCredits is sufficient (e.g., greater than a threshold value or low water mark), step 212. If the RecvCredits is sufficient, then a Credit Response is sent to the other endpoint, step 214, and the receive operation is done, step 210. If the RecvCredits is not sufficient, then the receive operation is done, step 210.

At step 204, if there is no data received and stored in the registered receive buffers 75 (FIG. 7), a packet is then received, step 218. The system stays at step 218 until a packet is received. A packet can be received by either blocking or waiting (e.g., VipRecvWait) or by polling (e.g., using the VipRecvDone(. .)) mechanisms. Thus, at step 204, the system is waiting for the next completed receive descriptor. If there is no error (step 220) in receiving the packet, the endpoint system then determines whether the packet is one of three types of packets.

At step 224, the system determines if the packet is a Credit Request. If the packet is a Credit Request, this indicates that the other endpoint would like to send data but has insufficient SendCredits and flow proceeds to step 226.

As a receive descriptor is completed by the VI NIC 18 (e.g., as the requested data is received and stored in a registered receive buffer 75), the receive descriptor is dequeued (e.g., removed) from the receive queues 19. Data packets must be enqueued and then transferred into application buffer 78 before the descriptor can be dequeued. However, receive descriptors for Credit Responses and Credit Requests can be re-posted immediately after the packet is read (since there is no data to transfer to the application). This descriptor is now free because the corresponding registered receive buffer 75 is now available. At step 226, the system then re-posts the free (or unused) receive descriptor(s) to the receive queue 19 and updates RecvCredits to reflect the additional registered receive buffers 75 that are now available to receive data.

At step 228, the endpoint determines whether the value of RecvCredits is sufficient. In other words, the endpoint determines whether the value of RecvCredits is greater than some threshold value. If RecvCredits is greater than the threshold value, a Credit Response is sent to the other endpoint, step 230, and then flow proceeds to step 234 where the lock is released.

If RecvCredits is not sufficient at step 228, the Credit Response is marked as pending at step 232. This indicates that a Credit Response should be sent later after sufficient free receive descriptors are posted and the RecvCredits is updated to be greater than the threshold value. Flow proceeds next to step 234, where the lock is released.

At step 224, if the received packet is not a Credit Request, the endpoint then determines whether the packet is a Credit Response, step 236. If the packet is not a Credit Response, then the packet is a Data packet, and the received data is enqueued (listed on the linked-list indicating that the data is stored in buffer 75 and is unread by the application) and RecvCredits is decremented by 1 to reflect the fact that an additional registered receive buffer 75 is in use (is unavailable), step 238.

Next, at step 240, the system polls the VI provider (e.g., the VI NIC 18) to determine if there are additional received packets. This can be done using the VipRecvDone (. .) VIPL primitive, for example. The object here at step 240 is to obtain any additional completed receive descriptors (indicating that packets have been received and stored in registered receive buffers 75). Step 240 must process all three types of packets, which is handled by the steps illustrated in FIG. 12.

After any additional completed descriptors are received (step 240), the process proceeds back to step 206. At step 206, the received data is copied into the application buffer 78, the free descriptors are re-posted on the receive queue 19, and the RecvCredits is updated. The objective at step 240 is to identify all received packets (in buffer(s) 75 based on detecting completed receive descriptors), and then the data for all of these packets is transferred to application buffers 78. This allows all the receive descriptors to be re-posted to permit the other endpoint to obtain sufficient SendCredits (indicating a sufficient number of available receive buffers) as quickly as possible.

At step 236, the endpoint determines if the packet is a Credit Response. If the packet is a Credit Response, the value of SendCredits is updated (incremented or increased) at step 242 based on the Credit Response (to indicate additional receive buffers at the other endpoint). The descriptor that was used for the received Credit Response is now free and is re-posted to the receive queue 19, step 242.

Moreover, if this receive process received a Credit Response, another thread that is sending data is waiting for a Credit Response. Therefore, at step 244, this thread releases the lock on the receive queue (to allow the sender to unblock or continue), and waits for the sender to exit or complete the Credit Request/Response exchange, step 246. Next, the flow proceeds back to step 202, where a lock on the receive queue is acquired and the system determines whether there is any data (step 204) or requests a packet (step 218).

Figure 12:
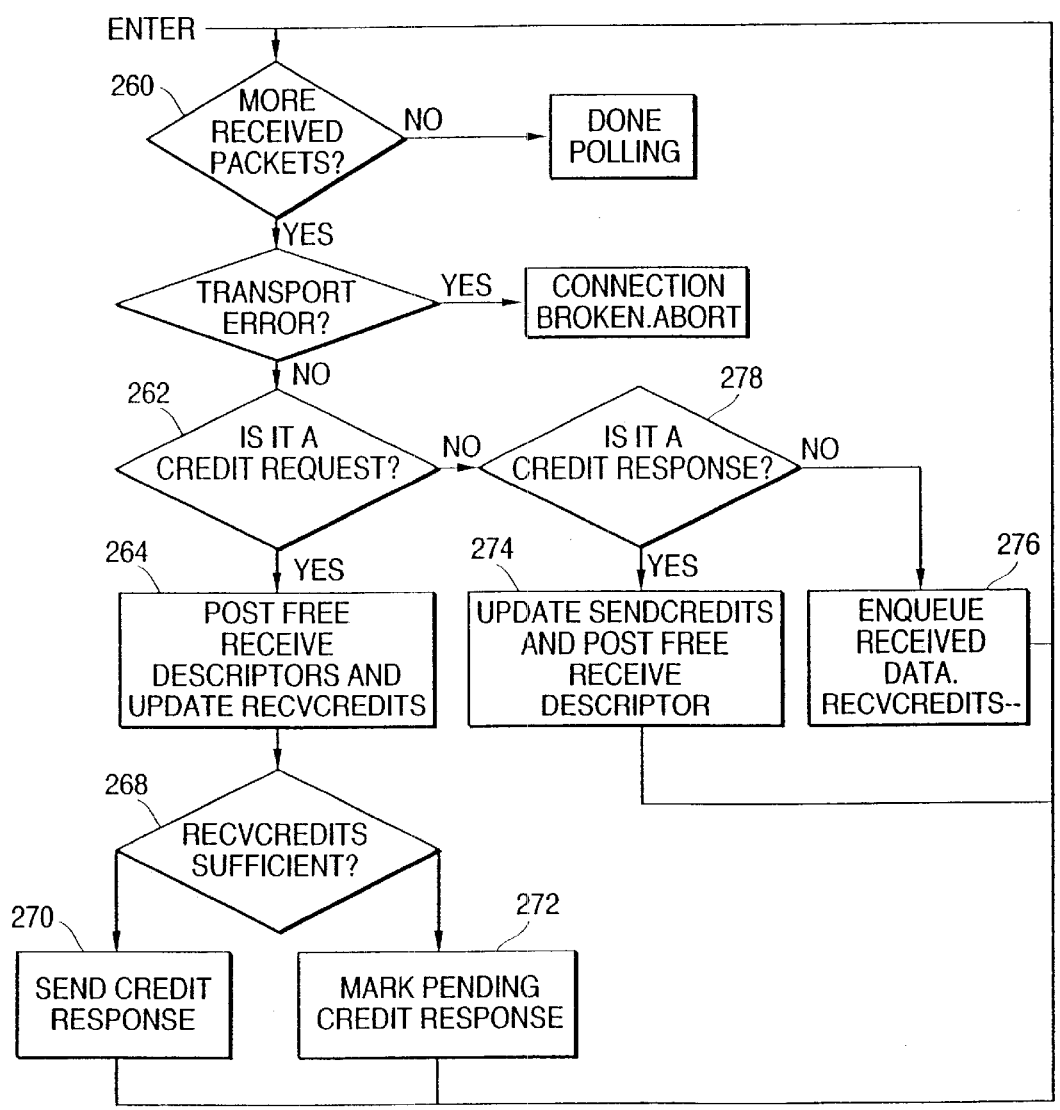
FIG. 12 is a flow chart illustrating details of the polling step of FIG. 11.

FIG. 12 is a flow chart illustrating details of the polling step of FIG. 11. At step 260, if there are more packets (e.g., if a completed receive descriptor is returned), then the system must identify what type of packet it is and process it accordingly. This process of FIG. 12 includes the steps 262 (Is it a Credit Request?), step 278 (Is it a Credit Response?), step 264 (post free descriptors and update RecvCredits), step 274 (update SendCredits and post free receive descriptors), step 276 (enqueue received data, decrement RecvCredits), step 268 (Recv Credits Sufficient?), step 270 (Send Credit response) and step 272 (Mark pending credit response), which are similar to steps 224,236,226,242,238,228,230 and 232 of FIG. 11, respectively. As a result, the description of these steps will not be repeated here.

Detailed pseudocode for send and receive operations according to further embodiments of the present invention are provided in Appendix A within this specification.

As described in detail above, a transport service provider is provided which is designed to operate over VI Architecture and provides some transport type services. The transport service provider performs flow control, fragmentation and reassembly and buffer management without adding unnecessary overhead. A credit-based flow control scheme reduces overhead by relying upon the reliability properties of the underlying VI Architecture. Three types of messages are used in the flow control scheme including Credit Request, Credit Response, and Data. The transport service provider is responsible for managing end-to-end flow control between two endpoints (e.g., sockets).

For providing the end-to-end flow control, a credit-based scheme is used. If the length of the data message to be sent is greater than the maximum transfer unit, then the message is fragmented into multiple packets. If the number of send credits is sufficient, then the sender prepares and sends the packet. Otherwise, the sender sends a Credit Request and waits for a Credit Response. Upon receiving the corresponding Credit Response, the sender continues sending packets. In response to a sender's request for credit update (the Credit Request), the receiver sends the Credit Response only when it has enough receive credits (above a threshold value or low water mark). The receive credits represent registered receive buffers that are available to receive incoming packets. In case of not having enough credits (or available receive buffers) when the Credit Request arrives, the receiver defers the sending of a Credit Response until sufficient receive credits are available (a sufficient number of receive buffers become available). According to an embodiment of the present invention, the credit-based flow control scheme is implemented through send and receive operations.

While the flow control scheme is designed to operate over the VI Architecture, it is not limited to the VI Architecture. Rather the flow control scheme of the present invention can be applied to other architectures. Moreover, the flow control scheme can advantageously be applied to other underlying architectures which may be the same or similar to VI architecture or include one or more of its fundamental properties. For example, it is unnecessary for the flow control scheme to detect data errors, provide positive packet acknowledgment, perform timeout and retransmission, detect duplicate packets, or provide packet sequencing because these reliability functions will be typically provided in the underlying architecture, such as in the VI Architecture. The VI Architecture also includes independent send an receive queues that allow a data transfer operation to be performed in two phases which are performed asynchronously. In a data transfer initiation (or request) phase, a descriptor is posted in a queue describing the data transfer operation. In the completion phase, the underlying architecture processes the descriptor by reliably transferring the data. Overhead and latency are reduced in the underlying architecture because it provides data transfer directly between the user-level and the network (e.g., without kernel processing and with few if any intermediate copies). Therefore, the transport service provider and flow control scheme of the present invention can advantageously be applied over any architecture that includes one or more of these or other basic features of the VI Architecture.

Several embodiments of the present invention are specifically illustrated and/or described herein. However, it will be appreciated that modifications and variations of the present invention are covered by the above teachings and within the purview of the appended claims without departing from the spirit and intended scope of the invention.

APPENDIX A
Pseudocode for Send and Receive Operations

Notations
s—a socket
RecvCredits—the number of buffers available for receiving data
SendCredits—the number of receive buffers available at the other end (sender's view)
buf—an application buffer
len—the length of buf (in bytes)
MTU—the maximum transfer unit
PendingCreditResponse—a boolean indicating whether there is a pending credit response
send(s,buf,len)—send len bytes of data from buf on socket s
receive(s, buf,len)—receive upto len bytes in buf on socket s Assumptions
  Each user-level stream socket is mapped to a VI.
  The mode used by each VI is reliable delivery. In this reliability mode, the data submitted for transfer will arrive at its destination exactly once, intact, and in the order submitted, in the absence of errors. Transport errors are rare and considered catastrophic. The connection is broken upon detection of any transport error.
  The Maximum Transfer Unit (MTU) used by both endpoints is same.
  Before the connection establishment between two endpoints, some finite number of registered receive buffers (each of MTU size) are pre-posted on both ends.
  The initial value of SendCredits is 0.
  At any given time, the number of threads performing send operation on a socket is at most 1. Similarly, for performing receive operations on a socket, the number of threads active at any given time is at most 1.
  For the receive operation, the data can be copied from registered internal buffers to application buffers.
  The pseudo-code for send and receive operations is described next. In describing pseudo-code, C-like programming style is used. The data structures used in the pseudo-code are local data structures of the socket.

---

Pseudocode for send(s.buf,len)

```
if (socket s is not in valid state for sending data)
   return error;
else {
   n = ⌈len/MTU⌉;
   i = 0;
   while (i < n) {
      if (SendCredits ≤ 2) {
         Send Credit Request;
         while (1) {
            Acquire lock on the receive queue;
            if (SendCredits > 2) {
               Release lock on the receive queue;
               Break innermost while loop;
            }
            else {
               Receive a packet and handle any errors;
               if (received packet is a credit request) {
                  Post free receive descriptors and
update RecvCredits;
                     if (RecvCredits is above low water
mark)
                        Send credit response;
                     else
                        PendingCreditResponse =
TRUE;
               }
               else if (received packet is a credit response)
                  Update SendCredits and post free
receive descriptor;;
               else /* data was received */
                  Enqueue received data;
                  RecvCredits =RecvCredits -1;
            end if
            if (SendCredits > 2) {
               Release lock on the receive queue;
               Break innermost while loop;
            }
         end if
         }
            end if
            Release lock on the receive queue;
         }
         end while
      }
      else {
         Prepare i$^{th}$ packet;
         Post i$^{th}$ packet on send queue;
         if (i$^{th}$ packet was successfully posted) {
            SendCredits SendCredits - 1;
            i = i + 1;
         }
         else
            return error;
         end if
      }
      end if
   }
   end while
   Complete all pending send descriptors and handle any errors.
}
end if
```

Pseudocode for recv(s.buf,len)

```
if (socket s is not in valid state for receiving data)
   return error;
else {
   while (1) {
      Acquire lock on the receive queue;
      if (there is received data on this socket) {
         Release lock on the receive queue;
         Break while loop;
      }
      else
      {
         Receive a packet and handle any errors;
         if (received packet is a credit request) {
            Post free receive descriptors and update
RecvCredits;
            if (RecvCredits is above low water mark)
               Send credit response;
            else
               PendingCreditResponse = TRUE;
         }
         else if (received packet is a credit response)
         {
            Update SendCredits and post free receive
descriptor;
            Release the lock on receive queue;
            Wait for sender to finish processing credit
```

-continued

```
request/response;
                Continue while loop;
        }
        else /* data was received */
        {
                Enqueue received data;
                RecvCredits =RecvCredits−1;
                while (1) {
                        Poll for a receive packet and handle any
errors;
                        if (a packet is received){
                                if (received packet is a credit
request) {
                                        Post free receive descriptor and update
        RecvCredits;
                                        if (RecvCredits is above low
water mark)
                                                Send credit response;
                                        else
                                                PendingCreditRespon
se TRUE;
                                        end if;
                                }
                                else if (received packet is a credit
response)
                                        Update SendCredits and post
free receive descriptor;
                                else /* data was received */
                                Enqueue received data;
                                RecvCredits=RecvCredits−1
                                end if
                                }
                                else
                                        Break innermost while loop;
                                end if;
                        }
                        end while;
                        Release the lock on receive queue;
                        Break the outermost while loop;
                }
                end if;
        }
        end if;
        Release lock on the receive queue;
}
end while;
Copy upto len bytes of received data into buf
Free the received buffers that are completely copied and post their
corresponding receive descriptors on receive queue;
Update RecvCredits;
if (PendingCreditResponse == TRUE) {
        if (RecvCredits is above the low water mark) {
                Send credit response;
                PendingCreditResponse = FALSE;
        }
        end if;
}
end if;
return;
}
end if;
```

APPENDIX B

Details of the Operations Performed by the Transport Service Provider 13 for Stream Sockets over Virtual Interface (VI) Architecture Service Provider Initialization (WSPStartup(Y))

When the first socket is created, then WinSock2 DLL initializes the service provider supporting that type of socket. The following are the steps performed by service provider when its startup routine is called by WinSock2 DLL.

1.1. Check for the version requested.
1.2. Fill out procedure table.
1.3. Fill out upcall procedure table.
1.4. Open VI NIC (VipOpenNic(..)).
1.5. Query VI NIC for NIC attributes (VipQueryNic(..)).
1.6. Create Protection tag (VipCreatePtag(..)).
1.7. Obtain parameters such as MTU, maximum pending connections, maximum number of sockets, maximum data segments, maximum registered application buffers, minimum size of registered application buffer, etc., from registry.
1.8. Allocate space for internal structure of endpoints.
1.9. Create a global pool of send descriptors and register memory reserved for send descriptors (VipRegisterMem (..)).
1.10. Create a global pool of receive descriptors and register memory reserved for receive descriptors (VipRegisterMem(..)).
1.11. Initialize name service (VipNSInit(..)).
1.12. Initialize global critical section.
2. Service Provider Cleanup (WSPCleanup(..))

The service provider clean up routine is called by WinSock2 DLL when application calls WSACleanup(..). The following are the steps performed by service provider when its startup routine is called.

2.1 Delete global critical section.
2.2 Shut down name service (VipNSShutdown(..)).
2.3 Deregister memory used by global pool of send descriptors (VipDeregisterMem(..)) and free that memory.
2.4 Deregister memory used by global pool of receive descriptors (VipDeregisterMem(..)) and free that memory.
2.5 Destroy protection tag (VipDestroyPtag(..)).
2.6 Close VI NIC (VipCloseNic(..)).
3. Service Provider Socket Creation (WSPSocket(..))

When application calls WSASocket(..) (similar to socket (..)) asking for creation of a socket with a particular service provider, the WinSock2 DLL calls WSPSocket(..) of service provider and the service provider performs the following steps.

3.1 Check the address family.
3.2 Check the socket type.
3.3 Check the protocol.
3.4 Check the group parameter and flag options.
3.5 Check for the maximum number of sockets.
3.6 Allocate space for internal structure of an endpoint.
3.7 Create an event handle for accepting connections on this socket.
3.8 Allocate space for remote network address.
3.9 Fill out VI attributes and create a VI associated with this socket (VipCreateVi(..)).
3.10 Assign buffer space for sends and receives.
3.11 Obtain send descriptors from the global pool of send descriptors.
3.12 Allocate a local pool of send buffers and register memory used for the send buffers (VipRegisterMem(..)).
3.13 Initialize SendCredits to 0.
3.14 Obtain receive descriptors from the global pool of receive descriptors.
3.15 Allocate a local pool of receive buffers and register memory used for the receive buffers (VipRegisterMem (..)).
3.16 Pre-post receive descriptors (using VipPostRecv(..)) and initialize RecvCredits.
3.17 Initialize critical sections used by this endpoint.
3.18 Create a socket handle.
4. Service Provider Socket Destruction (WSPCloseSocket (..))

When application calls WSACloseSocket(..) (similar to closesocket(..)) asking for destruction of a socket with a particular service provider, the WinSock2 DLL calls WSPCloseSocket(..) of service provider and the service provider performs the following steps.

4.1 Disconnect the VI (VipDisconnect(..)).
4.2 Dequeue send descriptors (VipSendDone(..)).
4.3 Dequeue receive descriptors (VipRecvDone(..)).
4.4 Query VI (VipQueryVi(..)).
4.5 Destroy VI (VipDestroyVi(..)).
4.6 Deregister memory associated with local pool of send buffers (VipDeregisterMem(..)) and free it.
4.7 Return send descriptors back to the global pool of send descriptors.
4.8 Deregister memory associated with local pool of send buffers (VipDeregisterMem(..)) and free it.
4.9 Return receive descriptors back to the global pool of receive descriptors.
4.10 Delete critical section associated with this endpoint.
5. Service Provider Binding to a Particular Address (WSPBind(..))
When the application calls WSABind(..) (or binds(..)), the WinSock2 DLL calls WSPBind(..). The service provider performs the following steps.
5.1 Copy IP address. If INADDR_ANY is specified, then it binds to the address returned by gethostbyname(..).
5.2 Copy port number. If port 0 is specified, it assigns a port to this address.
6. Service Provider Listening for Connections (WSPListen(..))
When server application calls WSAListen(..) (or listen(..) asking for listening for connections on this socket with a particular service provider, the WinSock2 DLL calls WSPListen(..) of service provider and the service provider performs the following steps.
6.1 Set up back log value.
6.2 If the socket is not in listening state, then start a thread dedicated to listening for connection on this socket. Otherwise, if the number of connection pending are above the new value of back log, then reject the excessive connections (VipConnectReject(..).
The connection thread performs the following operations.
1. Allocate space for local VIP_NET_ADDRESS.
2. Get the local VIP_NET_ADDRESS (VipNSGetHostByName(..)).
3. Copy port number into discriminator field of local VIP_NET_ADDRESS.
4. Allocate space for remote VIP_NET_ADDRESS.
Now repeat the following steps continuously.
5. Wait for connection requests (VipConnectWait(..)).
6. After receiving a connection request, store the connection handle, copy the remote VIP_NET_ADDRESS, and store the remote VI attributes.
7. If we have already maximum number of connections pending, reject this connection request (VipConnectReject(..)). Otherwise, enqueue this connection request and wake up threads waiting on accepting connections.
7. Service Provider Accepting Connections (WSPAccept(..))
When server application calls WSAAccept(..) (or accept(..)), the WinSock2 DLL calls WSPAccept(..) of service provider. Then, the service provider performs the following steps.
7.1 While there are no pending connection requests, wait for connection requests (wait on accept event). After getting a pending connection request, perform the next steps.
7.2 Create a new socket and allocate space for internal endpoint structure.
7.3 Allocate space for remote VIP_NET_ADDRESS and copy remote VIP_NET_ADDRESS.
7.4 Fill out VI attributes and create a VI (VipCreateVi(..)).
7.5 Assign buffer space for sends and receives.
7.6 Obtain send descriptors from the global pool of send descriptors.
7.7 Allocate a local pool of send buffers and register memory used for the send buffers (VipRegisterMem(..)).
7.8 Initialize SendCredits to 0.
7.9 Obtain receive descriptors from the global pool of receive descriptors.
7.10 Allocate a local pool of receive buffers and register memory used for the receive buffers (VipRegisterMem(..)).
7.11 Pre-post receive descriptors (using VipPostRecv(..)) and initialize RecvCredits.
7.12 Initialize critical sections used by new endpoint.
7.13 If local and remote VI attributes do not match, then reject the connection (VipConnectReject(..)). Otherwise, accept the connection (VipConnectAccept(..)).
7.14 If the connection is successfully accepted, then dequeue the connection request and return the handle of the newly created socket.
8. Service Provider Connecting to the Server (WSPConnect(..))
When client application calls WSAConnect(..) (or connect(..)), the WinSock2 DLL calls WSPConnect(..). The service provider performs the following steps.
8.1 Check for invalid operations.
8.2 Copy socket address of the remote endpoint.
8.3 Allocate space for remote VIP_NET_ADDRESS.
8.4 Copy port number of the remote address into discriminator field of VIP_NET_ADDRESS.
8.5 Get local VIP_NET_ADDRESS (VipNSGetHostByName(..)).
8.6 Copy local port number into discriminator field of local VIP_NET_ADDRESS.
8.7 Send a connection request to the server (VipConnectRequest(..)).
8.8 Wait for the completion of connection request.
8.9 Return status of the completion of the connection request.
9. Service Provider Send Operation (WSPSend(..))
When the client application wants to send data on a particular socket it calls WSASend(..) (or send(..)). The WinSock2 DLL then calls WSPSend(..) of the service provider. Then, the service provider then performs the following operations.

9.1 Check for invalid operations.
9.2 Calculate the number of packets to send.
9.3 For each packet (in order) repeat the following steps.
    9.3.1 If SendCredits > 2, then
        9.3.1.1 Get a free send descriptor.
        9.3.1.2 Set up control segment of the send descriptor.
        9.3.1.3 If the application buffer is not registered, then copy data from application buffer to a registered send buffer.
        9.3.1.4 Set up data segments of the send descriptor.
        9.3.1.5 Post send descriptor (VipPostSend(..)) on send queue and handle errors if any.
        9.3.1.6 Decrement SendCredits
    9.3.2 else,
        9.3.2.1 Get a free send descriptor.
        9.3.2.2 Set up send descriptor for sending credit request.
        9.3.2.3 Post send descriptor (VipPostSend(..)) on send queue and handle errors if any.
        9.3.2.4 Wait for a credit response. Perform following steps while waiting.
            9.3.2.4.1 Acquire lock on receive queue.
            9.3.2.4.2 Check whether we have already received credit response.

-continued

```
9.3.2.4.3  Otherwise, wait for a receive descriptor to complete
           (VipRecvWait(..)) and handle errors if any.
    9.3.2.4.3.1  If receive descriptor completed successfully,
                 then process it in the following manner.
        9.3.2.4.3.1.1  If received packet is a credit request, then
            9.3.2.4.3.1.1.1  Post the completed receive descriptor
                             on receive queue (VipPostRecv(.)) and
                             handle errors if any.
            9.3.2.4.3.1.1.2  Get a free send descriptor for sending
                             credit response.
            9.3.2.4.3.1.1.3  Setup free receive descriptors and post
                             them on receive queue
                             (VipPostRecv(..)).
            9.3.2.4.3.1.1.4  Update RecvCredits.
            9.3.2.4.3.1.1.5  If RecvCredits is sufficient, then
                9.3.2.4.3.1.1.5.1    Set up send descriptor for
                                     credit response.
                9.3.2.4.3.1.1.5.2    Post send descriptor on
                                     send queue
                                     (VipPostSend(..))
                                     and handle errors if any.
            9.3.2.4.3.1.1.6  else, mark credit response pending.
        9.3.2.4.3.1.2  else if received packet is a credit response,
                       then
            9.3.2.4.3.1.2.1  Update SendCredits.
            9.3.2.4.3.1.2.2  Free the receive descriptor.
            9.3.2.4.3.1.2.3  Post it back on receive queue
                             (VipPostRecv(..))
                             and handle errors if any.
```

-continued

```
        9.3.2.4.3.1.3  else (it is data), enqueue received data.
            9.3.2.4.3.1.3.1  Enqueue received data
            9.3.2.4.3.1.3.2  Decrement RecvCredits
    9.3.2.4.4  If we received a credit response, then continue
               sending this packet (step 9.3.1).
    9.3.2.4.5  Else, release lock on receive queue and continue
               waiting for a credit response (9.3.2.4).
```

9.4 Complete all pending send descriptors. Repeat the following step for each send descriptor pending.

9.4.1 Poll for completion of send descriptor (VipPostSend (..)).

9.4.2 If send queue is empty, then stop (WSPSend(..) completes here), 9.4.3 else if send descriptor completed successfully, then continue processing (9.4.1), 9.4.4 else, handle errors.

10. Service Provider Receive Operation (WSPRecv(..))

When the client application wants to receive data on a particular socket it calls WSARecv(..) (or recv(..)). The WinSock2 DLL then calls WSPRecv(..) of the service provider. Then, the service provider then performs the following operations.

```
10.1 Check for invalid operations.
10.2 While data is not received on this socket perform the following
     operations.
    10.2.1 Acquire lock on receive queue.
    10.2.2 If we received data, then step 10.2 is done,
    10.2.3 else, wait for a receive descriptor to complete (VipRecvWait(..)) and
           handle errors if any.
    10.2.4 If receive descriptor completed successfully, then process it in the
           following manner.
        10.2.4.1 If received packet is a credit request, then
            10.2.4.1.1 Post the completed receive descriptor on receive queue
                       (VipPostRecv(..)) and handle errors if any.
            10.2.4.1.2 Get a free send descriptor for sending credit response.
            10.2.4.1.3 Set up free receive descriptors and post them on receive
                       queue (VipPostRecv(..)).
            10.2.4.1.4 Update RecvCredits.
            10.2.4.1.5 If RecvCredits is sufficient, then
                10.2.4.1.5.1.1 Set up send descriptor for credit response.
                10.2.4.1.5.1.2 Post send descriptor on send queue
                               (VipPostSend(..)) and handle errors if any.
            10.2.4.1.6 else, mark credit response pending.
        10.2.4.2 else if received packet is a credit response, then
            10.2.4.2.1 Update SendCredits.
            10.2.4.2.2 Free the receive descriptor.
            10.2.4.2.3 Post the receive descriptor back on receive queue
                       (VipPostRecv(..)) and handle errors if any.
        10.2.4.3 else, (it is data)
            10.2.4.3.1 Enqueue received data and Decrement RecvCredits
            10.2.4.3.2 Poll for more completed receive descriptors
                       (VipRecvDone(..)).
                10.2.4.3.2.1 If no completed receive descriptor was found, then
                             go to step 10.2.5.
                10.2.4.3.2.2 else, process the completed receive descriptor in the
                             following manner.
                    10.2.4.3.2.2.1 If received packet is a credit request, then
                        10.2.4.3.2.2.1.1 Post the completed receive descriptor on
                                         receive queue (VipPostRecv(..)) and handle
                                         errors if any.
                        10.2.4.3.2.2.1.2 Get a free send descriptor for sending
                                         credit response.
                        10.2.4.3.2.2.1.3 Set up free receive descriptors and post
                                         them on receive queue (VipPostRecv(..)).
                        10.2.4.3.2.2.1.4 Update RecvCredits.
```

-continued

```
        10.2.4.3.2.2.1.5 If RecvCredits is sufficient, then
            10.2.4.3.2.2.1.5.1 Set up send descriptor for credit
                response.
            10.2.4.3.2.2.1.5.2 Post send descriptor on send queue
                (VipPostSend(..)) and handle errors if any.
        10.2.4.3.2.2.1.6 else, mark credit response pending.
      10.2.4.3.2.2.2 else if received packet is a credit response, then
        10.2.4.3.2.2.2.1 Update SendCredits.
        10.2.4.3.2.2.2.2 Free the receive descriptor.
        10.2.4.3.2.2.2.3 Post the receive descriptor back on receive
            queue (VipPostRecv(..)) and handle errors if
            any.
      10.2.4.3.2.2.3 Else, enqueue received data.
        10.2.4.3.2.2.3.1 Enqueue received data and decrement
            RecvCredits
      10.2.4.3.2.2.4 continue from step 10.2.4.3.2.
  10.2.5 Release lock on receive queue.
  10.2.6 Copy received data into application buffer.
  10.2.7 Set up free receive descriptors and post them on receive queue
      (VipPostRecv(..)).
  10.2.8 If there is a credit response pending and if we have sufficient RecvCredits,
      then send credit response.
```

What is claimed is:

1. A first endpoint system for communicating with a second endpoint system across a network, the first endpoint system comprising:
  an interface consumer, including:
    an application;
    a plurality of send and receive buffers;
    a transport service provider coupled to the application, the transport service provider providing an end-to-end credit-based flow control for transferring data between the first and second endpoints;
    an interface user agent coupled to the transport service provider;
  an interface provider coupled to the interface user agent, the interface provider including:
    a kernel agent;
    a plurality of work queues; and
    a network interface controller coupled to the kernel agent and the work queues;
  said interface user agent issuing one or more control commands to the kernel agent to establish a connection between the first and second endpoint systems across the network and posting data transfer requests to the work queues in response to commands from the transport service provider; and
  the network interface controller processing the data transfer requests by transferring data between the send and receive buffers and the network.

2. The first endpoint system of claim 1 wherein:
  the interface consumer comprises Virtual Interface (VI) consumer in accordance with at least a portion of the Virtual Interface Architecture and which also includes the transport service provider providing an end-to-end credit-based flow control for transferring data between the first and second endpoints; and
  the interface provider comprises a Virtual Interface (VI) provider in accordance with at least a portion of the Virtual Interface Architecture.

3. The first endpoint system of claim 2 wherein the user agent comprises a Virtual Interface (VI) user agent, the kernel agent comprises a Virtual Interface (VI) kernel agent, and the network interface controller comprises a Virtual Interface (VI) network interface controller.

4. A first endpoint system for communicating with a second endpoint system across a network, said first endpoint system comprising:
  an application, the application including send and receive application buffers;
  an operating system communications facility coupled to the application and adapted to receive commands from the application;
  a transport service provider coupled to the communications facility and adapted to receive commands from the operating system communications facility, the transport service provider providing an end-to-end credit-based flow control for data transfer across the network;
  a network interface controller coupled to the network;
  a plurality of work queues coupled to the network interface controller for posting data transfer requests thereto;
  a user agent coupled to the send and receive buffers, the operating system communications facility and the network interface controller, the user agent posting data transfer requests to the work queues in response to commands from the operating system communications facility, the network interface controller processing the posted data transfer requests by transferring data between the send and receive buffers and a network.

5. An endpoint system for communicating with another endpoint system across a network, the endpoint system comprising:
  an interface consumer, including:
    an application;
    a plurality of send and receive buffers;
    a transport service provider providing an end-to-end credit-based flow control for transferring data; and
    an interface user agent;
  an interface provider including:
    a kernel agent;
    a plurality of work queues; and
    a network interface controller;
  said interface user agent issuing one or more control commands to the kernel agent to establish a connection across the network and posting data transfer requests to the work queues in response to commands from the transport service provider; and
  the network interface controller processing the data transfer requests by transferring data between the send and receive buffers and the network.

6. The endpoint system of claim 5, wherein:

the interface consumer comprises Virtual Interface (VI) consumer in accordance with at least a portion of the Virtual Interface Architecture and which also includes the transport service provider providing an end-to-end credit-based flow control for transferring data between endpoints; and the interface provider comprises a Virtual Interface (VD) provider in accordance with at least a portion of the Virtual Interface Architecture.

7. The endpoint system of claim 5, wherein the user agent comprises a Virtual Interface (VI) user agent, the kernel agent comprises a Virtual Interface (VI) kernel agent, and the network interface controller comprises a Virtual Interface (VI) network interface controller.

8. An endpoint system for communicating with another endpoint system across a network, said endpoint system comprising:

an application including send and receive application buffers;

an operating system communications facility to receive commands from the application;

a transport service provider to receive commands from the operating system communications facility, the transport service provider providing an end-to-end credit-based flow control for data transfer across the network;

a network interface controller coupled to the network;

a plurality of work queues for posting data transfer requests thereto; and a user agent to post data transfer requests to the work queues in response to commands from the operating system communications facility, the network interface controller processing the posted data transfer requests by transferring data between the send and receive buffers and said network.

* * * * *